(12) United States Patent
Chang

(10) Patent No.: US 11,079,569 B2
(45) Date of Patent: Aug. 3, 2021

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventor: An-Kai Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 54 days.

(21) Appl. No.: 15/972,332

(22) Filed: May 7, 2018

(65) Prior Publication Data

US 2019/0033561 A1    Jan. 31, 2019

(30) Foreign Application Priority Data

Jul. 31, 2017   (CN) .......................... 201710638825.X

(51) Int. Cl.
*G02B 9/60* (2006.01)
*G02B 13/04* (2006.01)

(52) U.S. Cl.
CPC ............... *G02B 9/60* (2013.01); *G02B 13/04* (2013.01)

(58) Field of Classification Search
CPC ........ G02B 3/04; G02B 9/60; G02B 13/0045; G02B 13/18; G02B 23/243; G02B 23/2438; G02B 13/06
USPC ................................................ 359/708–718
See application file for complete search history.

(56) References Cited

U.S. PATENT DOCUMENTS

| 7,746,572 B2* | 6/2010 | Asami ...................... G02B 9/34 359/783 |
| 8,098,441 B2* | 1/2012 | Sasamoto .......... G02B 23/2407 359/656 |
| 8,248,715 B2* | 8/2012 | Asami .................... G02B 13/04 359/762 |
| 8,477,436 B2* | 7/2013 | Sasamoto .......... A61B 1/00188 359/793 |

(Continued)

FOREIGN PATENT DOCUMENTS

| CN | 103926674 A | 7/2014 |
| CN | 204009203 U | 12/2014 |
| CN | 106680966 A | 5/2017 |

OTHER PUBLICATIONS

English language translation (machine translation) of Chinese Office Action dated Feb. 25, 2020 in China Invention Patent Application No. 201710638825.X.

*Primary Examiner* — Nicholas R. Pasko
(74) *Attorney, Agent, or Firm* — McClure, Qualey & Rodack, LLP

(57) ABSTRACT

A wide-angle lens assembly includes a first lens, a second lens, a third lens, a fourth lens, and a fifth lens, wherein the first lens, the second lens, the third lens, the fourth lens, and the fifth lens are arranged in order from an object side to an image side along an optical axis. The first lens is a meniscus lens with negative refractive power. The second lens is with positive refractive power and includes a convex surface facing the object side. The third lens is with positive refractive power and includes a convex surface facing the image side. The fourth lens is with positive refractive power and includes a convex surface facing the object side. The fifth lens is with negative refractive power and includes a concave surface facing the object side and a convex surface facing the image side.

19 Claims, 16 Drawing Sheets

(56) References Cited

U.S. PATENT DOCUMENTS

| | | | |
|---|---|---|---|
| 8,654,457 B2* | 2/2014 | Jin | G02B 13/06 |
| | | | 359/763 |
| 2004/0240081 A1 | 12/2004 | Saito | |
| 2014/0268369 A1* | 9/2014 | Chen | G02B 13/0045 |
| | | | 359/715 |
| 2015/0009580 A1* | 1/2015 | Lee | G02B 13/04 |
| | | | 359/714 |
| 2015/0092284 A1* | 4/2015 | Liao | G02B 13/0045 |
| | | | 359/714 |
| 2015/0370043 A1* | 12/2015 | Huang | G02B 13/06 |
| | | | 359/355 |
| 2017/0168264 A1* | 6/2017 | Chen | G02B 13/0015 |
| 2017/0235123 A1* | 8/2017 | Kamo | G02B 9/34 |
| | | | 359/738 |
| 2019/0101725 A1* | 4/2019 | Jung | G02B 9/60 |

* cited by examiner

WIDE-ANGLE LENS ASSEMBLY

BACKGROUND OF THE INVENTION

Field of the Invention

The invention relates to a wide-angle lens assembly.

Description of the Related Art

The current development trend of a wide-angle lens assembly is toward miniaturization, large field of view, and small F-number. Additionally, the wide-angle lens assembly is developed to have resistance to severe environment temperature variation in accordance with different application requirements. However, the known wide-angle lens assembly can't satisfy such requirements. Therefore, the wide-angle lens assembly needs a new structure in order to meet the requirements of miniaturization, large field of view, small F-number, and resistance to severe environment temperature variation at the same time.

BRIEF SUMMARY OF THE INVENTION

The invention provides a wide-angle lens assembly to solve the above problems. The wide-angle lens assembly of the invention is provided with characteristics of a shortened total lens length, a larger field of view, a smaller F-number, a resistance to severe environment temperature variation, and still has a good optical performance.

The wide-angle lens assembly in accordance with an exemplary embodiment of the invention includes a first lens, a second lens, a third lens, a fourth lens, and a fifth lens, wherein the first lens, the second lens, the third lens, the fourth lens, and the fifth lens are arranged in order from an object side to an image side along an optical axis. The first lens is a meniscus lens with negative refractive power. The second lens is with positive refractive power and includes a convex surface facing the object side. The third lens is with positive refractive power and includes a convex surface facing the image side. The fourth lens is with positive refractive power and includes a convex surface facing the object side. The fifth lens is with negative refractive power and includes a concave surface facing the object side and a convex surface facing the image side.

In another exemplary embodiment, the first lens further includes a convex surface facing the object side, the second lens further includes a convex surface facing the image side, the third lens further includes a concave surface facing the object side, and the fourth lens further includes a convex surface facing the image side.

In yet another exemplary embodiment, the wide-angle lens assembly satisfies: $Vd_1+Vd_2 \geq 90$, $Vd_4-Vd_3 \geq 20$, wherein $Vd_1$ is an Abbe number of the first lens, $Vd_2$ is an Abbe number of the second lens, $Vd_3$ is an Abbe number of the third lens, and $Vd_4$ is an Abbe number of the fourth lens.

In another exemplary embodiment, the wide-angle lens assembly satisfies: $AAG/TTL \geq 0.55$, wherein AAG is a total air interval from the first lens to an image plane along the optical axis and TTL is an interval from the convex surface of the first lens to the image plane along the optical axis.

In yet another exemplary embodiment, the wide-angle lens assembly satisfies: $0.28 \leq BFL/TTL \leq 0.38$, wherein BFL is an interval from the convex surface of the fifth lens to the image plane along the optical axis.

In another exemplary embodiment, the wide-angle lens assembly satisfies: $Nd_3-Nd_4 \geq 0.23$, wherein $Nd_3$ is an index of refraction of the third lens and $Nd_4$ is an index of refraction of the fourth lens.

In yet another exemplary embodiment, the wide-angle lens assembly satisfies: $0.9 \leq f_2/f_3 \leq 1.3$, wherein $f_2$ is an effective focal length of the second lens and $f_3$ is an effective focal length of the third lens.

In another exemplary embodiment, the wide-angle lens assembly satisfies: $1.2 \leq |f_1|/f \leq 1.6$, wherein $f_1$ is an effective focal length of the first lens and f is an effective focal length of the wide-angle lens assembly.

In yet another exemplary embodiment, the fourth lens and the fifth lens are cemented and the wide-angle lens assembly further includes a stop disposed between the first lens and the second lens.

In another exemplary embodiment, the first lens further includes a concave surface facing the image side, the second lens further includes a concave surface facing the image side, the third lens further includes a convex surface facing the object side, and the fourth lens further includes a convex surface facing the image side.

In yet another exemplary embodiment, the wide-angle lens assembly satisfies: $Vd_1+Vd_2 \geq 90$, $Vd_4-Vd_3 \geq 20$, wherein $Vd_1$ is an Abbe number of the first lens, $Vd_2$ is an Abbe number of the second lens, $Vd_3$ is an Abbe number of the third lens, and $Vd_4$ is an Abbe number of the fourth lens.

In another exemplary embodiment, the wide-angle lens assembly satisfies: $AAG/TTL \geq 0.55$, wherein AAG is a total air interval from the first lens to an image plane along the optical axis and TTL is an interval from an object side surface of the first lens to the image plane along the optical axis.

In yet another exemplary embodiment, the wide-angle lens assembly satisfies: $0.28 \leq BFL/TTL \leq 0.38$, wherein BFL is an interval from the convex surface of the fifth lens to the image plane along the optical axis.

In another exemplary embodiment, the wide-angle lens assembly satisfies: $Nd_3-Nd_4 \leq 0.23$, wherein $Nd_3$ is an index of refraction of the third lens and $Nd_4$ is an index of refraction of the fourth lens.

In yet another exemplary embodiment, the wide-angle lens assembly satisfies: $0.9 \leq f_2/f_3 \leq 1.3$, wherein $f_2$ is an effective focal length of the second lens and $f_3$ is an effective focal length of the third lens.

In another exemplary embodiment, the wide-angle lens assembly satisfies: $1.2 \leq |f_1|/f \leq 1.6$, wherein $f_1$ is an effective focal length of the first lens and f is an effective focal length of the wide-angle lens assembly.

In yet another exemplary embodiment, the fourth lens and the fifth lens are cemented and the wide-angle lens assembly further includes a stop disposed between the first lens and the second lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
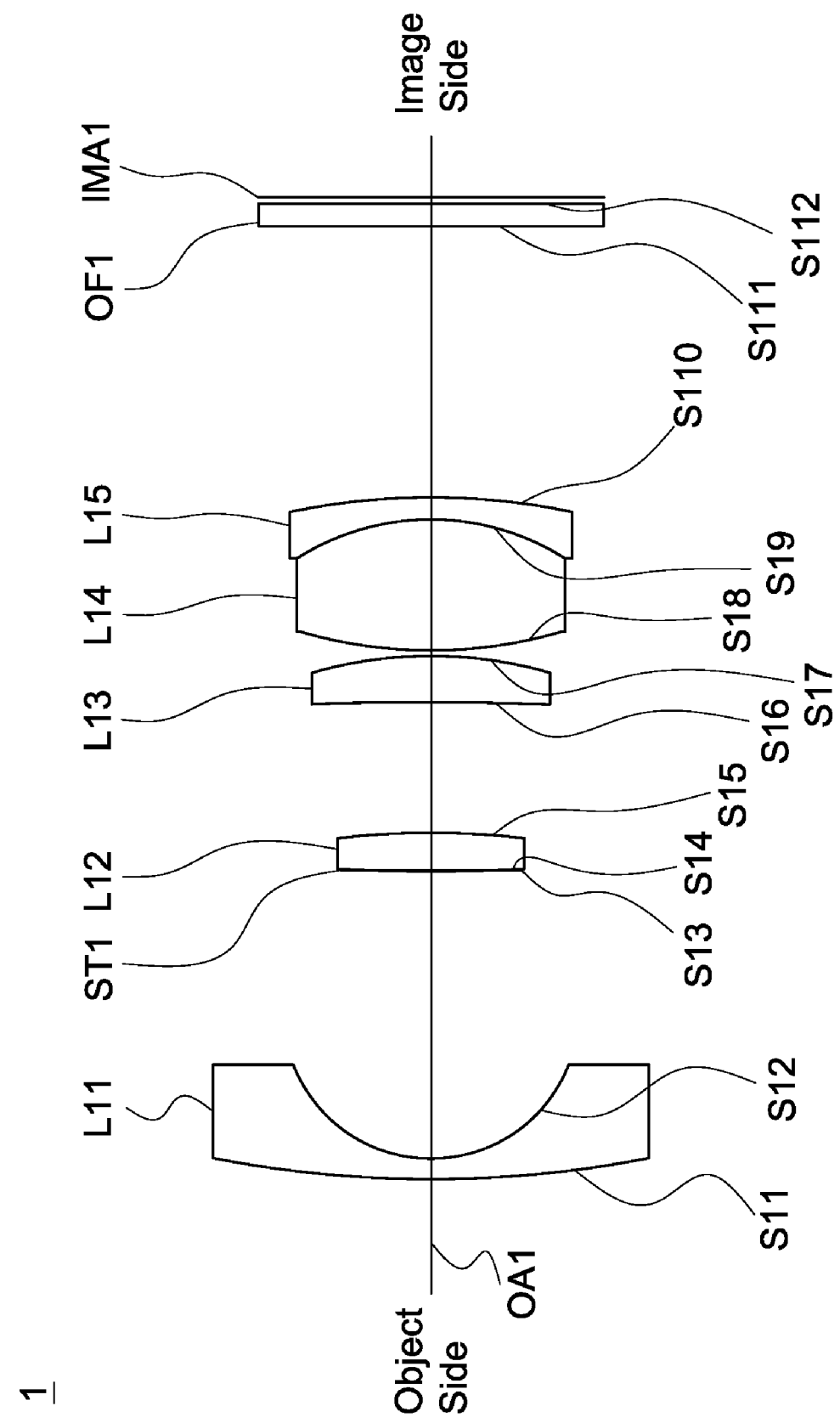
FIG. 1 is a lens layout diagram of a wide-angle lens assembly in accordance with a first embodiment of the invention.

Referring to FIG. 1, FIG. 1 is a lens layout diagram of a wide-angle lens assembly in accordance with a first embodiment of the invention. The wide-angle lens assembly 1 includes a first lens L11, a stop ST1, a second lens L12, a third lens L13, a fourth lens L14, a fifth lens L15, and an optical filter OF1, all of which are arranged in order from an object side to an image side along an optical axis OA1. In operation, an image of light rays from the object side is formed at an image plane IMA1.

The first lens L11 is a meniscus lens with negative refractive power and made of glass material, wherein the object side surface S11 is a convex surface, the image side surface S12 is a concave surface, and both of the object side surface S11 and image side surface S12 are spherical surfaces.

The second lens L12 is a biconvex lens with positive refractive power and made of glass material, wherein the object side surface S14 is a convex surface, the image side surface S15 is a convex surface, and both of the object side surface S14 and image side surface S15 are spherical surfaces.

The third lens L13 is a meniscus lens with positive refractive power and made of glass material, wherein the object side surface S16 is a concave surface, the image side surface S17 is a convex surface, and both of the object side surface S16 and image side surface S17 are spherical surfaces.

The fourth lens L14 is a biconvex lens with positive refractive power and made of glass material, wherein the object side surface S18 is a convex surface, the image side surface S19 is a convex surface, and both of the object side surface S18 and image side surface S19 are spherical surfaces.

The fifth lens L15 is a meniscus lens with negative refractive power and made of glass material, wherein the object side surface S19 is a concave surface, the image side surface S110 is a convex surface, and both of the object side surface S19 and image side surface S110 are spherical surfaces.

The fourth lens L14 and the fifth lens L15 are cemented.

Both of the object side surface S111 and image side surface S112 of the optical filter OF1 are plane surfaces.

In order to maintain excellent optical performance of the wide-angle lens assembly in accordance with the first embodiment of the invention, the wide-angle lens assembly 1 satisfies at least one of the following conditions:

$$Vd1_1 + Vd1_2 \geq 90 \qquad (1)$$

$$Vd1_4 - Vd1_3 \geq 20 \qquad (2)$$

$$AAG1/TTL1 \geq 0.55 \qquad (3)$$

$$0.28 \leq BFL1/TTL1 \leq 0.38 \qquad (4)$$

$$Nd1_3 - Nd1_4 \geq 0.23 \qquad (5)$$

$$0.9 \leq f1_2/f1_3 \leq 1.3 \qquad (6)$$

$$1.2 \leq |f1_1/f1| \leq 1.6 \qquad (7)$$

wherein $Vd1_1$ is an Abbe number of the first lens L11, $Vd1_2$ is an Abbe number of the second lens L12, $Vd1_3$ is an Abbe number of the third lens L13, $Vd1_4$ is an Abbe number of the fourth lens L14, AAG1 is a total air interval from the first lens L11 to the image plane IMA1 along the optical axis OA1, TTL1 is an interval from the convex surface S11 of the first lens L11 to the image plane IMA1 along the optical axis OA1, BFL1 is an interval from the image side surface S110 of the fifth lens L15 to the image plane IMA1 along the optical axis OA1, $Nd1_3$ is an index of refraction of the third lens L13, $Nd1_4$ is an index of refraction of the fourth lens L14, f1 is an effective focal length of the wide-angle lens assembly 1, $f1_1$ is an effective focal length of the first lens L11, $f1_2$ is an effective focal length of the second lens L12, and $f1_3$ is an effective focal length of the third lens L13.

By the above design of the lenses, stop ST1, and satisfies at least one of the conditions (1)-(7), the wide-angle lens assembly 1 is provided with an effective increased field of view, an effective shortened total lens length, an effective decreased F-number, an effective corrected aberration, and a resistance to severe environment temperature variation.

If the value $f1_2/f1_3$ of condition (6) is greater than 1.3 than the ability of correcting the aberration is not good. Therefore, the value $f1_2/f1_3$ must be at least equal to or less than 1.3. An optimal range for $f1_2/f1_3$ is from 0.9 to 1.3. The wide-angle lens assembly 1 has best corrected aberration and helps to reduce sensitivity when satisfies the condition: $0.9 \leq f1_2/f1_3 \leq 1.3$.

In order to achieve the above purposes and effectively enhance the optical performance, the wide-angle lens assembly 1 in accordance with the first embodiment of the invention is provided with the optical specifications shown in Table 1, which include the effective focal length, F-number, total lens length, radius of curvature of each lens surface, thickness between adjacent surface, refractive index of each lens, and Abbe number of each lens. Table 1 shows that the effective focal length is equal to 3.126 mm, F-number is equal to 1.96, and total lens length is equal to 17.787 mm for the wide-angle lens assembly 1 of the first embodiment of the invention.

TABLE 1

Effective Focal Length = 3.126 mm
F-number = 1.96
Total Lens Length = 17.787 mm

| Surface Number | Radius of Curvature (mm) | Thickness (mm) | Nd | Vd | Remark |
|---|---|---|---|---|---|
| S11 | 21.071 | 0.400 | 1.64 | 67.5 | The First Lens L11 |
| S12 | 2.707 | 5.198 | | | |
| S13 | ∞ | −0.027 | | | Stop ST1 |
| S14 | 29.131 | 0.702 | 1.77 | 49.6 | The Second Lens L12 |
| S15 | −15.118 | 2.361 | | | |
| S16 | −56.593 | 0.841 | 1.86 | 37.6 | The Third Lens L13 |
| S17 | −7.798 | 0.100 | | | |
| S18 | 8.539 | 2.373 | 1.62 | 63.4 | The Fourth Lens L14 |
| S19 | −4.558 | 0.401 | 2.01 | 17.0 | The Fifth Lens L15 |
| S110 | −12.555 | 4.913 | | | |
| S111 | ∞ | 0.400 | 1.52 | 54.5 | Optical Filter OF1 |
| S112 | ∞ | 0.125 | | | |

Table 2 shows the parameters and condition values for conditions (1)-(7). As can be seen from Table 2, the wide-angle lens assembly 1 of the first embodiment satisfies the conditions (1)-(7).

TABLE 2

| | | | | | |
|---|---|---|---|---|---|
| $Vd1_1$ | 67.5 | $Vd1_2$ | 49.6 | $Vd1_3$ | 37.6 |
| $Vd1_4$ | 63.4 | AAG1 | 13.07 mm | TTL1 | 17.787 mm |
| BFL1 | 5.438 mm | $Nd1_3$ | 1.86 | $Nd1_4$ | 1.62 |
| $f1_1$ | −4.889 mm | $f1_2$ | 12.926 mm | $f1_3$ | 10.391 mm |
| f1 | 3.126 mm | | | | |
| $Vd1_1 + Vd1_2$ | 117.1 | $Vd1_4 - Vd1_3$ | 25.8 | AAG1/TTL1 | 0.735 |
| BFL1/TTL1 | 0.306 | $Nd1_3 - Nd1_4$ | 0.24 | $f1_2/f1_3$ | 1.24 |
| $|f1_1/f1|$ | 1.56 | | | | |

Figure 2A:
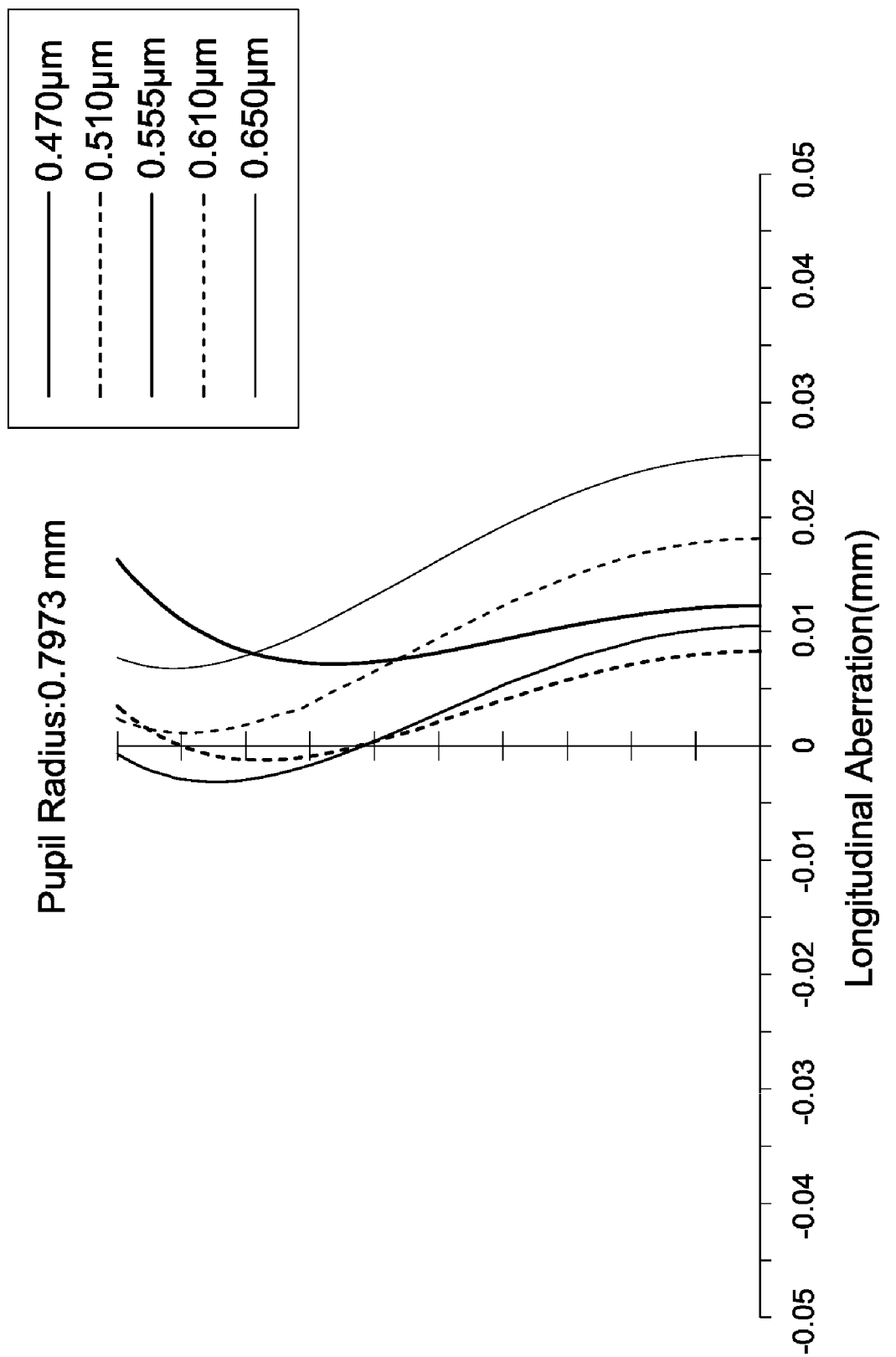
FIG. 2A depicts a longitudinal aberration diagram of the wide-angle lens assembly in accordance with the first embodiment of the invention.
Figure 2B:
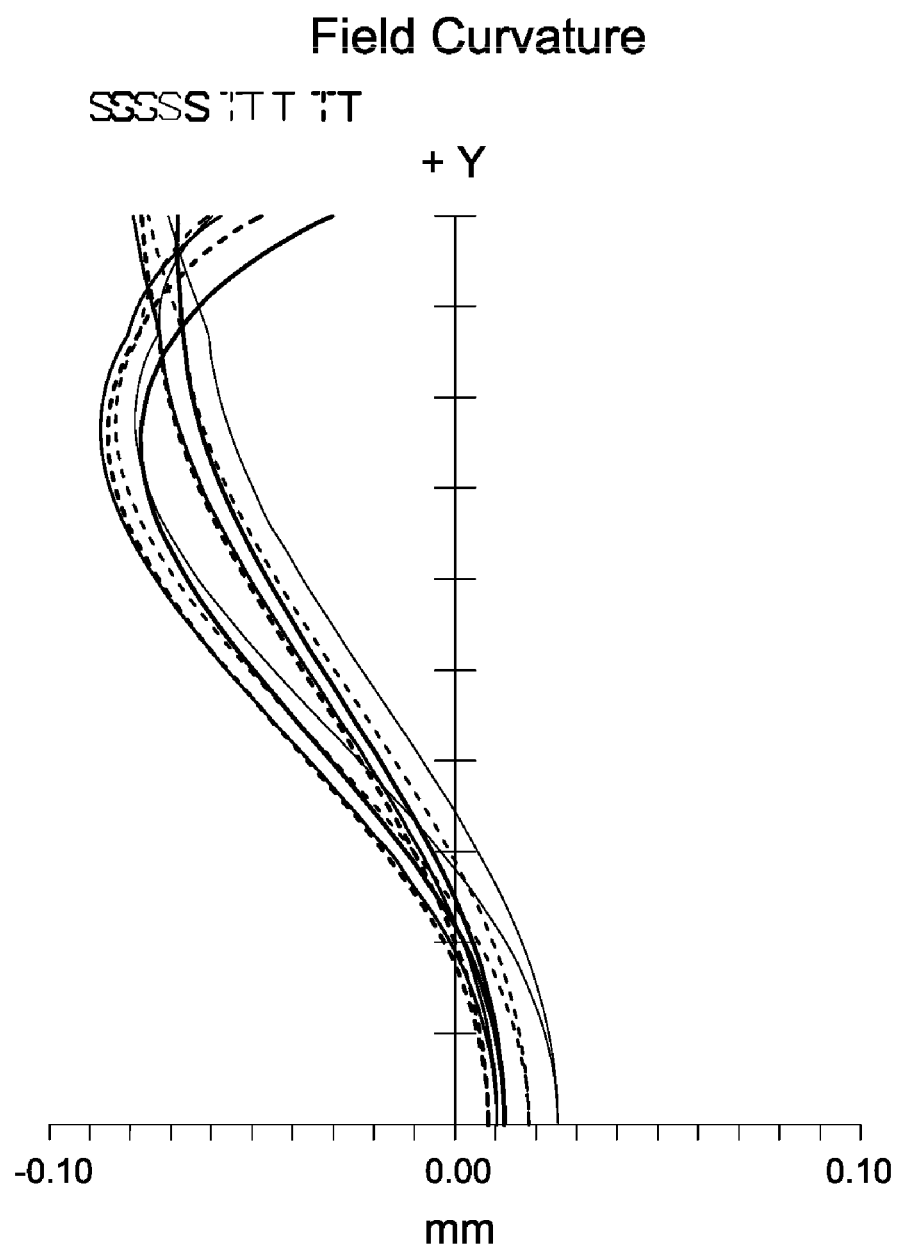
FIG. 2B is a field curvature diagram of the wide-angle lens assembly in accordance with the first embodiment of the invention.
Figure 2C:
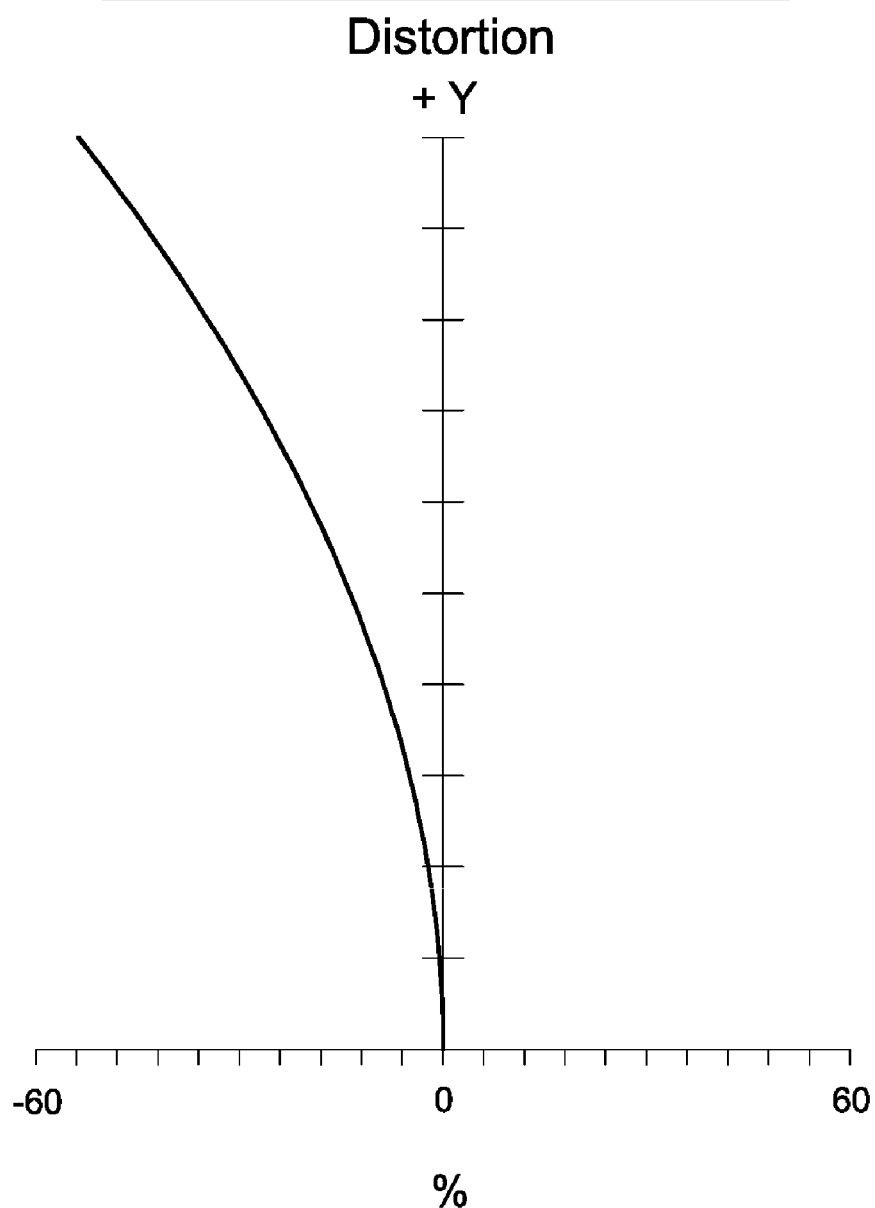
FIG. 2C is a distortion diagram of the wide-angle lens assembly in accordance with the first embodiment of the invention.

By the above arrangements of the lenses and stop ST1, the wide-angle lens assembly 1 of the first embodiment can meet the requirements of optical performance as seen in FIGS. 2A-2C, wherein FIG. 2A shows a longitudinal aberration diagram of the wide-angle lens assembly 1 in accordance with the first embodiment of the invention, FIG. 2B shows a field curvature diagram of the wide-angle lens assembly 1 in accordance with the first embodiment of the invention, and FIG. 2C shows a distortion diagram of the wide-angle lens assembly 1 in accordance with the first embodiment of the invention.

It can be seen from FIG. 2A that the longitudinal aberration in the wide-angle lens assembly 1 of the first embodiment ranges from −0.005 mm to 0.026 mm for the wavelength of 0.470 µm, 0.510 µm, 0.555 µm, 0.610 µm, and 0.650 µm.

It can be seen from FIG. 2B that the field curvature of tangential direction and sagittal direction in the wide-angle lens assembly 1 of the first embodiment ranges from −0.09 mm to 0.03 mm for the wavelength of 0.470 µm, 0.510 µm, 0.555 µm, 0.610 µm, and 0.650 µm.

It can be seen from FIG. 2C (in which the five lines in the figure almost coincide to appear as if a signal line) that the distortion in the wide-angle lens assembly 1 of the first embodiment ranges from −54% to 0% for the wavelength of 0.470 µm, 0.510 µm, 0.555 µm, 0.610 µm, and 0.650 µm.

It is obvious that the longitudinal aberration, the field curvature, and the distortion of the wide-angle lens assembly 1 of the first embodiment can be corrected effectively. Therefore, the wide-angle lens assembly 1 of the first embodiment is capable of good optical performance.

Figure 3:
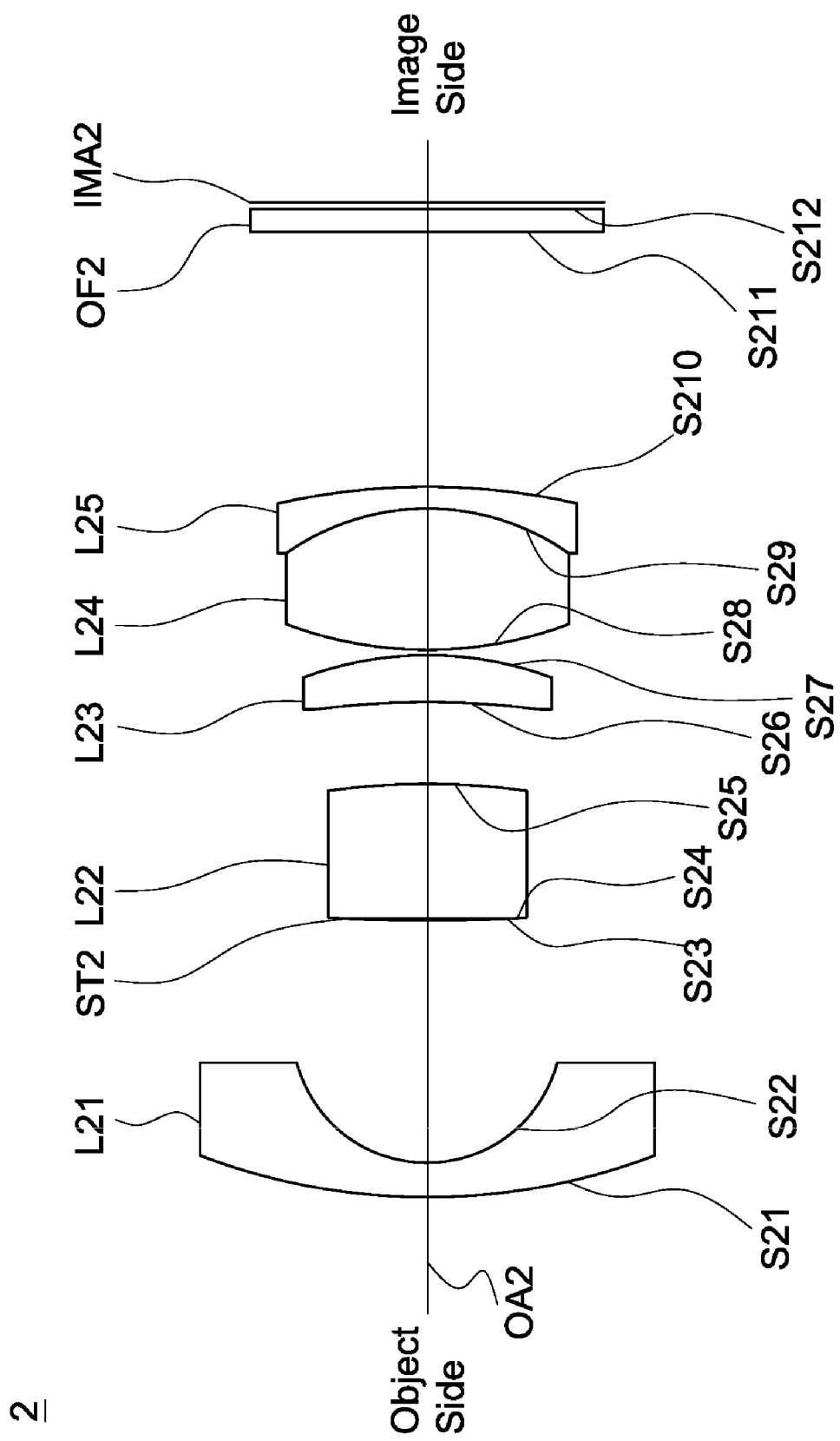
FIG. 3 is a lens layout diagram of a wide-angle lens assembly in accordance with a second embodiment of the invention.

Referring to FIG. 3, FIG. 3 is a lens layout diagram of a wide-angle lens assembly in accordance with a second embodiment of the invention. The wide-angle lens assembly 2 includes a first lens L21, a stop ST2, a second lens L22, a third lens L23, a fourth lens L24, a fifth lens L25, and an optical filter OF2, all of which are arranged in order from an object side to an image side along an optical axis OA2. In operation, an image of light rays from the object side is formed at an image plane IMA2.

The first lens L21 is a meniscus lens with negative refractive power and made of glass material, wherein the object side surface S21 is a convex surface, the image side surface S22 is a concave surface, and both of the object side surface S21 and image side surface S22 are spherical surfaces.

The second lens L22 is a biconvex lens with positive refractive power and made of glass material, wherein the object side surface S24 is a convex surface, the image side surface S25 is a convex surface, and both of the object side surface S24 and image side surface S25 are spherical surfaces.

The third lens L23 is a meniscus lens with positive refractive power and made of glass material, wherein the object side surface S26 is a concave surface, the image side surface S27 is a convex surface, and both of the object side surface S26 and image side surface S27 are spherical surfaces.

The fourth lens L24 is a biconvex lens with positive refractive power and made of glass material, wherein the object side surface S28 is a convex surface, the image side surface S29 is a convex surface, and both of the object side surface S28 and image side surface S29 are spherical surfaces.

The fifth lens L25 is a meniscus lens with negative refractive power and made of glass material, wherein the object side surface S29 is a concave surface, the image side surface S210 is a convex surface, and both of the object side surface S29 and image side surface S210 are spherical surfaces.

The fourth lens L24 and the fifth lens L25 are cemented.

Both of the object side surface S211 and image side surface S212 of the optical filter OF2 are plane surfaces.

In order to maintain excellent optical performance of the wide-angle lens assembly in accordance with the second embodiment of the invention, the wide-angle lens assembly 2 satisfies at least one of the following conditions:

$$Vd2_1 + Vd2_2 \geq 90 \qquad (8)$$

$$Vd2_4 - Vd2_3 \geq 20 \qquad (9)$$

$$AAG2/TTL2 \geq 0.55 \qquad (10)$$

$0.28 \leq BFL2/TTL2 \leq 0.38$      (11)

$Nd2_3 - Nd2_4 \geq 0.23$      (12)

$0.9 \leq f2_2/f2_3 \leq 1.3$      (13)

$1.2 \leq |f2_1/f2| \leq 1.6$      (14)

The definition of $Vd2_1$, $Vd2_2$, $Vd2_3$, $Vd2_4$, AAG2, TTL2, BFL2, $Nd2_3$, $Nd2_4$, f2, $f2_1$, $f2_2$, and $f2_3$ are the same as that of $Vd1_1$, $Vd1_2$, $Vd1_3$, $Vd1_4$, AAG1, TTL1, BFL1, $Nd1_3$, $Nd1_4$, f1, $f1_1$, $f1_2$, and $f1_3$ in the first embodiment, and is not described here again.

By the above design of the lenses, stop ST2, and satisfies at least one of the conditions (8)-(14), the wide-angle lens assembly 2 is provided with an effective increased field of view, an effective shortened total lens length, an effective decreased F-number, an effective corrected aberration, and a resistance to severe environment temperature variation.

If the value $|f2_1/f2|$ of condition (14) is less than 1.2 than the manufacturing for the wide-angle lens assembly is not good. Therefore, the value $|f2_1/f2|$ must be at least equal to or greater than 1.2. An optimal range for $|f2_1/f2|$ is from 1.2 to 1.6. A better balance between the optical characteristics and manufacturing for the wide-angle lens assembly 2 can be achieved when the optimal range is satisfied. If the value $|f2_1/f2|$ increases than the manufacturing for the wide-angle lens assembly 2 goes well. If the value $|f2_1/f2|$ decreases than the resolution of periphery for the wide-angle lens assembly 2 goes higher.

In order to achieve the above purposes and effectively enhance the optical performance, the wide-angle lens assembly 2 in accordance with the second embodiment of the invention is provided with the optical specifications shown in Table 3, which include the effective focal length, F-number, total lens length, radius of curvature of each lens surface, thickness between adjacent surface, refractive index of each lens, and Abbe number of each lens. Table 3 shows that the effective focal length is equal to 2.872 mm, F-number is equal to 2.0, and total lens length is equal to 17.7 mm for the wide-angle lens assembly 2 of the second embodiment of the invention.

TABLE 3

Effective Focal Length = 2.872 mm
F-number = 2.0
Total Lens Length = 17.7 mm

| Surface Number | Radius of Curvature (mm) | Thickness (mm) | Nd | Vd | Remark |
|---|---|---|---|---|---|
| S21 | 11.363 | 0.641 | 1.74 | 55.0 | The First Lens L21 |
| S22 | 2.419 | 4.315 | | | |
| S23 | ∞ | −0.019 | | | Stop ST2 |
| S24 | 26.779 | 2.423 | 1.77 | 49.6 | The Second Lens L22 |
| S25 | −12.178 | 1.452 | | | |
| S26 | −15.199 | 0.830 | 1.95 | 30.9 | The Third Lens L23 |
| S27 | −6.411 | 0.099 | | | |
| S28 | 6.984 | 2.504 | 1.62 | 63.4 | The Fourth Lens L24 |
| S29 | −4.431 | 0.400 | 2.10 | 17.0 | The Fifth Lens L25 |
| S210 | −11.720 | 4.530 | | | |
| S211 | ∞ | 0.400 | 1.52 | 54.5 | Optical Filter OF2 |
| S212 | ∞ | 0.125 | | | |

Table 4 shows the parameters and condition values for conditions (8)-(14). As can be seen from Table 4, the wide-angle lens assembly 2 of the second embodiment satisfies the conditions (8)-(14).

TABLE 4

| $Vd2_1$ | 55.0 | $Vd2_2$ | 49.6 | $Vd2_3$ | 30.9 |
|---|---|---|---|---|---|
| $Vd2_4$ | 63.4 | AAG2 | 10.503 mm | TTL2 | 17.7 mm |
| BFL2 | 5.055 mm | $Nd2_3$ | 1.95 | $Nd2_4$ | 1.62 |
| $f2_1$ | −4.261 mm | $f2_2$ | 11.098 mm | $f2_3$ | 11.078 mm |
| f2 | 2.872 mm | | | | |
| $Vd2_1 + Vd2_2$ | 104.6 | $Vd2_4 - Vd2_3$ | 32.5 | AAG2/TTL2 | 0.593 |
| BFL2/TTL2 | 0.286 | $Nd2_3 - Nd2_4$ | 0.33 | $f2_2/f2_3$ | 1.00 |
| $|f2_1/f2|$ | 1.48 | | | | |

Figure 4A:
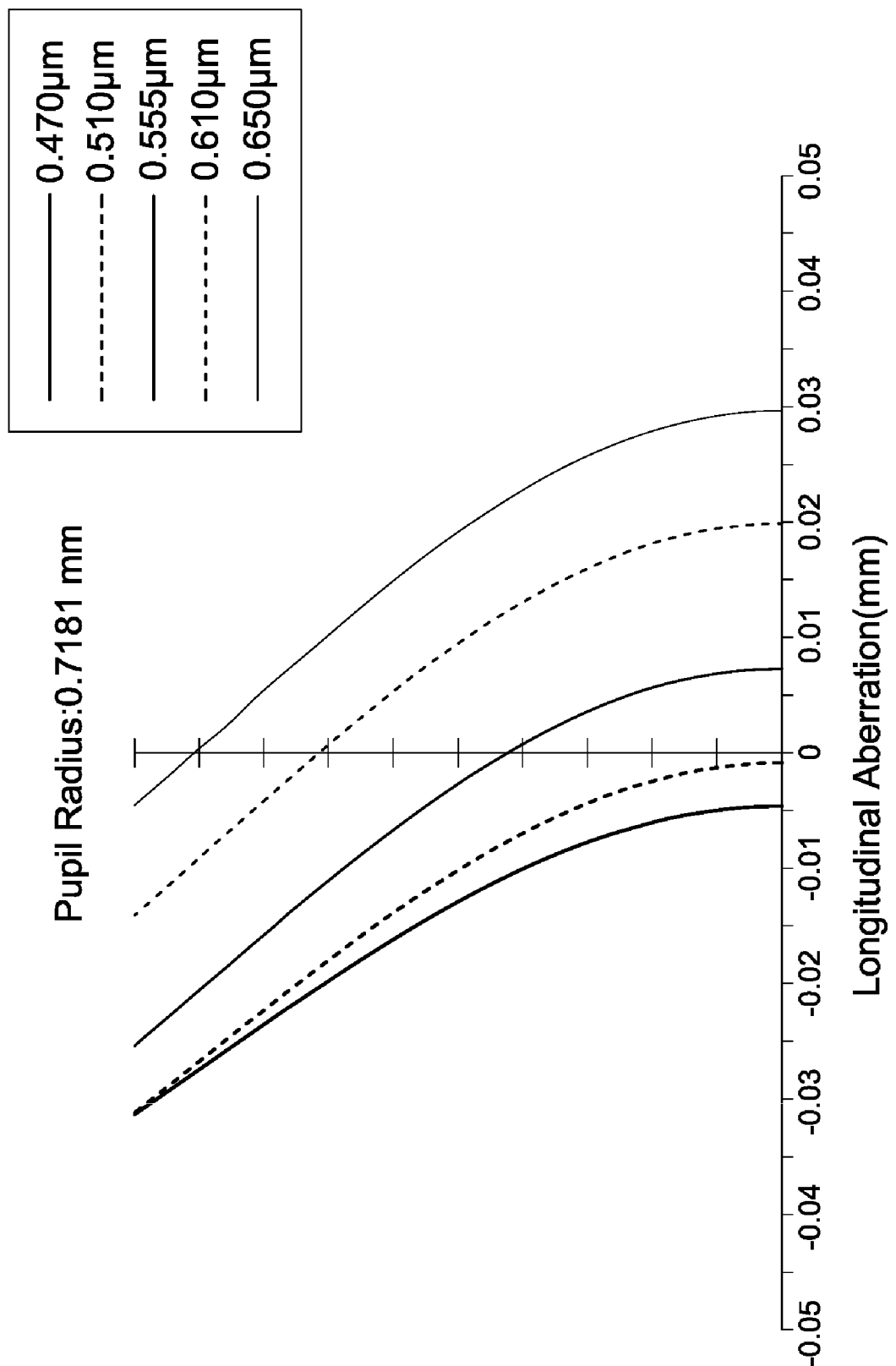
FIG. 4A depicts a longitudinal aberration diagram of the wide-angle lens assembly in accordance with the second embodiment of the invention.
Figure 4B:
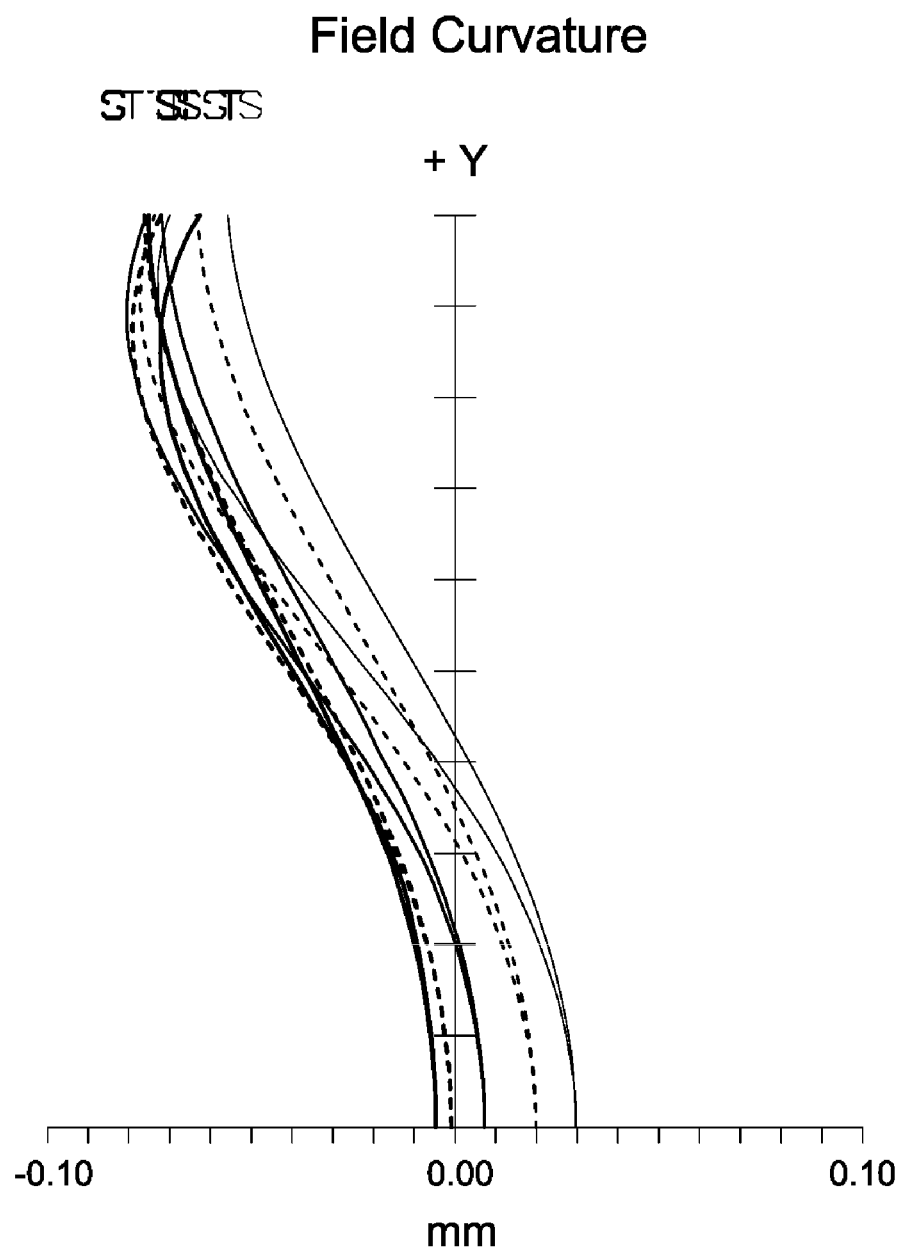
FIG. 4B is a field curvature diagram of the wide-angle lens assembly in accordance with the second embodiment of the invention.
Figure 4C:
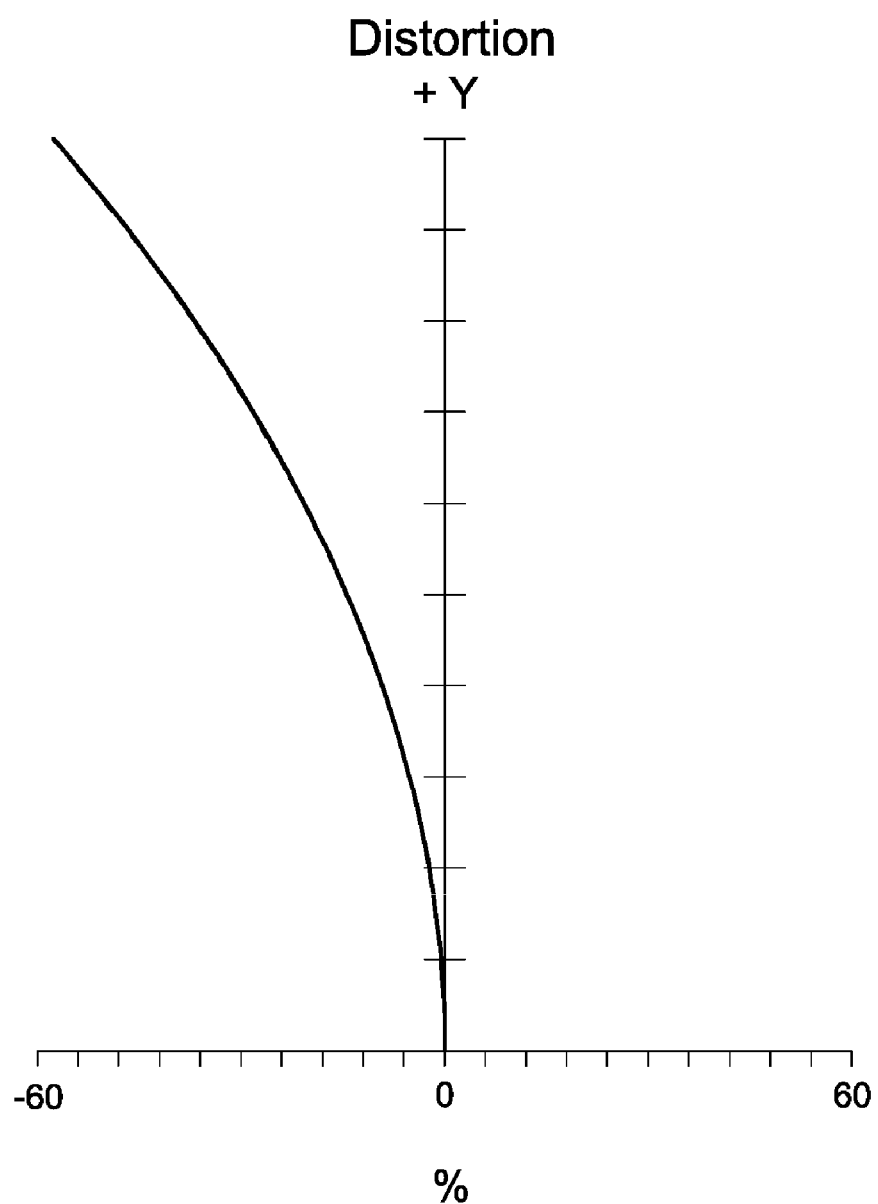
FIG. 4C is a distortion diagram of the wide-angle lens assembly in accordance with the second embodiment of the invention.

By the above arrangements of the lenses and stop ST2, the wide-angle lens assembly 2 of the second embodiment can meet the requirements of optical performance as seen in FIGS. 4A-4C, wherein FIG. 4A shows a longitudinal aberration diagram of the wide-angle lens assembly 2 in accordance with the second embodiment of the invention, FIG. 4B shows a field curvature diagram of the wide-angle lens assembly 2 in accordance with the second embodiment of the invention, and FIG. 4C shows a distortion diagram of the wide-angle lens assembly 2 in accordance with the second embodiment of the invention.

It can be seen from FIG. 4A that the longitudinal aberration in the wide-angle lens assembly 2 of the second embodiment ranges from −0.035 mm to 0.03 mm for the wavelength of 0.470 μm, 0.510 μm, 0.555 μm, 0.610 μm, and 0.650 μm.

It can be seen from FIG. 4B that the field curvature of tangential direction and sagittal direction in the wide-angle lens assembly 2 of the second embodiment ranges from −0.08 mm to 0.03 mm for the wavelength of 0.470 μm, 0.510 μm, 0.555 μm, 0.610 μm, and 0.650 μm.

It can be seen from FIG. 4C (in which the five lines in the figure almost coincide to appear as if a signal line) that the distortion in the wide-angle lens assembly 2 of the second embodiment ranges from −60% to 0% for the wavelength of 0.470 μm, 0.510 μm, 0.555 μm, 0.610 μm, and 0.650 μm.

It is obvious that the longitudinal aberration, the field curvature, and the distortion of the wide-angle lens assembly 2 of the second embodiment can be corrected effectively. Therefore, the wide-angle lens assembly 2 of the second embodiment is capable of good optical performance.

Figure 5:
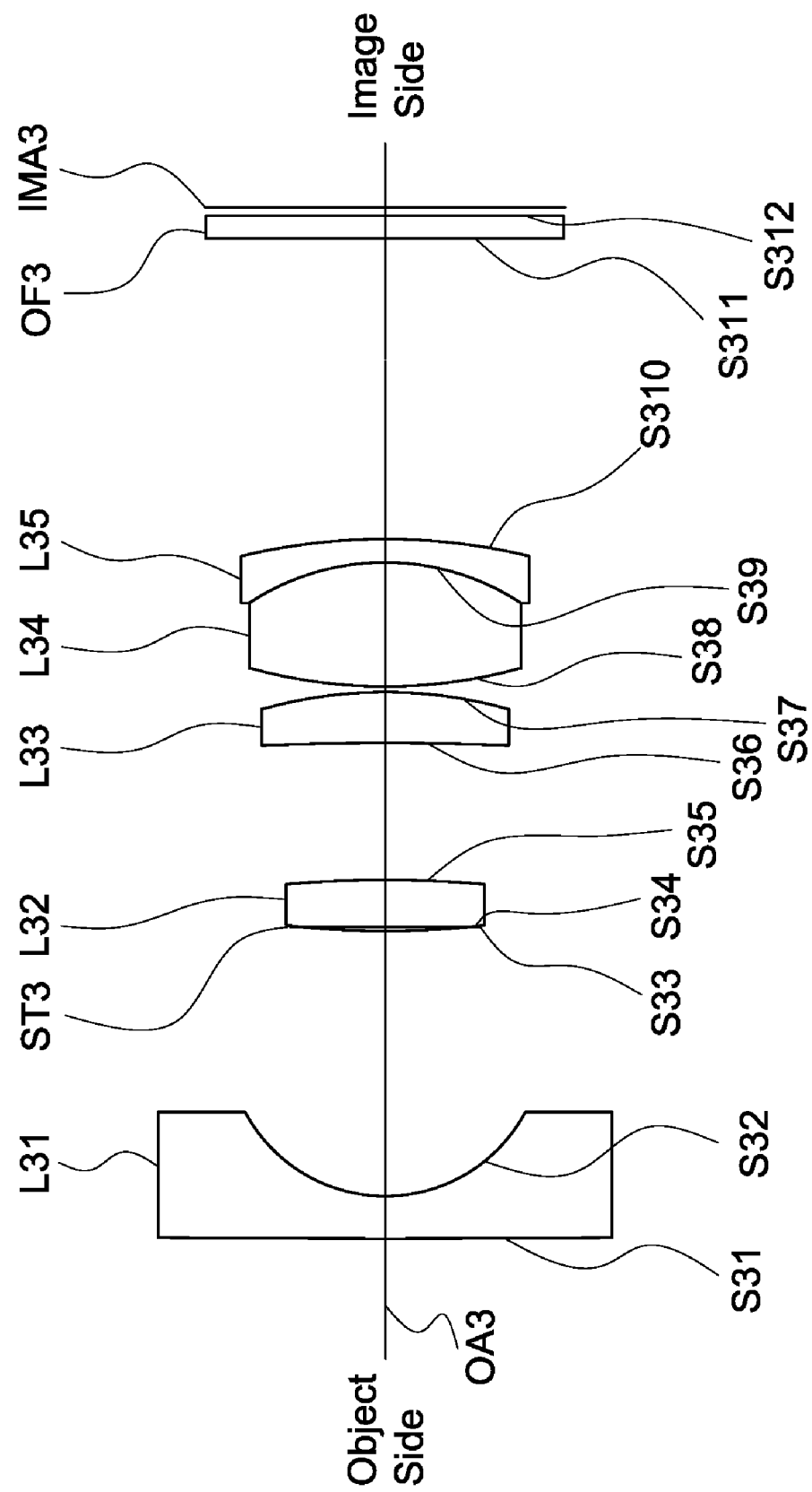
FIG. 5 is a lens layout diagram of a wide-angle lens assembly in accordance with a third embodiment of the invention.

Referring to FIG. 5, FIG. 5 is a lens layout diagram of a wide-angle lens assembly in accordance with a third embodiment of the invention. The wide-angle lens assembly 3 includes a first lens L31, a stop ST3, a second lens L32, a third lens L33, a fourth lens L34, a fifth lens L35, and an optical filter OF3, all of which are arranged in order from an object side to an image side along an optical axis OA3. In operation, an image of light rays from the object side is formed at an image plane IMA3.

The first lens L31 is a meniscus lens with negative refractive power and made of glass material, wherein the object side surface S31 is a convex surface, the image side surface S32 is a concave surface, and both of the object side surface S31 and image side surface S32 are spherical surfaces.

The second lens L32 is a biconvex lens with positive refractive power and made of glass material, wherein the object side surface S34 is a convex surface, the image side surface S35 is a convex surface, and both of the object side surface S34 and image side surface S35 are spherical surfaces.

The third lens L33 is a meniscus lens with positive refractive power and made of glass material, wherein the object side surface S36 is a concave surface, the image side surface S37 is a convex surface, and both of the object side surface S36 and image side surface S37 are spherical surfaces.

The fourth lens L34 is a biconvex lens with positive refractive power and made of glass material, wherein the object side surface S38 is a convex surface, the image side surface S39 is a convex surface, and both of the object side surface S38 and image side surface S39 are spherical surfaces.

The fifth lens L35 is a meniscus lens with negative refractive power and made of glass material, wherein the object side surface S39 is a concave surface, the image side surface S310 is a convex surface, and both of the object side surface S39 and image side surface S310 are spherical surfaces.

The fourth lens L34 and the fifth lens L35 are cemented.

Both of the object side surface S311 and image side surface S312 of the optical filter OF3 are plane surfaces.

In order to maintain excellent optical performance of the wide-angle lens assembly in accordance with the third embodiment of the invention, the wide-angle lens assembly 3 satisfies at least one of the following conditions:

$$Vd3_1 + Vd3_2 \geq 90 \quad (15)$$

$$Vd3_4 - Vd3_3 \geq 20 \quad (16)$$

$$AAG3/TTL3 \geq 0.55 \quad (17)$$

$$0.28 \leq BFL3/TTL3 \leq 0.38 \quad (18)$$

$$Nd3_3 - Nd3_4 \geq 0.23 \quad (19)$$

$$0.9 \leq f3_2/f3_3 \leq 1.3 \quad (20)$$

$$1.2 \leq |f3_1/f3| \leq 1.6 \quad (21)$$

The definition of $Vd3_1$, $Vd3_2$, $Vd3_3$, $Vd3_4$, AAG3, TTL3, BFL3, $Nd3_3$, $Nd3_4$, f3, $f3_1$, $f3_2$, and $f3_3$ are the same as that of $Vd1_1$, $Vd1_2$, $Vd1_3$, $Vd1_4$, AAG1, TTL1, BFL1, $Nd1_3$, $Nd1_4$, f1, $f1_1$, $f1_2$, and $f1_3$ in the first embodiment, and is not described here again.

By the above design of the lenses, stop ST3, and satisfies at least one of the conditions (15)-(21), the wide-angle lens assembly 3 is provided with an effective increased field of view, an effective shortened total lens length, an effective decreased F-number, an effective corrected aberration, and a resistance to severe environment temperature variation.

If the value $Vd3_1 + Vd3_2$ of condition (15) is less than 90 than the achromatic ability for the wide-angle lens assembly 3 is not good. Therefore, the value $Vd3_1 + Vd3_2$ must be at least equal to or greater than 90. An optimal range for $Vd3_1 + Vd3_2$ is equal to or greater than 90. The best achromatic condition for the wide-angle lens assembly 3 can be achieved when the optimal range is satisfied.

In order to achieve the above purposes and effectively enhance the optical performance, the wide-angle lens assembly 3 in accordance with the third embodiment of the invention is provided with the optical specifications shown in Table 5, which include the effective focal length, F-number, total lens length, radius of curvature of each lens surface, thickness between adjacent surface, refractive index of each lens, and Abbe number of each lens. Table 5 shows that the effective focal length is equal to 3.29 mm, F-number is equal to 2.0, and total lens length is equal to 18.173 mm for the wide-angle lens assembly 3 of the third embodiment of the invention.

TABLE 5

Effective Focal Length = 3.29 mm
F-number = 2.0
Total Lens Length = 18.173 mm

| Surface Number | Radius of Curvature (mm) | Thickness (mm) | Nd | Vd | Remark |
|---|---|---|---|---|---|
| S31 | 483.773 | 0.753 | 1.62 | 63.40 | The First Lens L31 |
| S32 | 2.801 | 4.746 | | | |
| S33 | ∞ | −0.07 | | | Stop ST3 |
| S34 | 15.277 | 0.893 | 1.80 | 41.50 | The Second Lens L32 |
| S35 | −22.690 | 2.414 | | | |
| S36 | −52.587 | 0.900 | 1.91 | 35.30 | The Third Lens L33 |
| S37 | −8.039 | 0.100 | | | |
| S38 | 9.033 | 2.183 | 1.62 | 63.40 | The Fourth Lens L34 |
| S39 | −4.392 | 0.412 | 2.10 | 17.00 | The Fifth Lens L35 |
| S310 | −10.939 | 5.292 | | | |
| S311 | ∞ | 0.400 | 1.52 | 54.50 | Optical Filter OF3 |
| S312 | ∞ | 0.150 | | | |

Table 6 shows the parameters and condition values for conditions (15)-(21). As can be seen from Table 6, the wide-angle lens assembly 3 of the third embodiment satisfies the conditions (15)-(21).

TABLE 6

| | | | | | |
|---|---|---|---|---|---|
| $Vd3_1$ | 64.3 | $Vd3_2$ | 41.5 | $Vd3_3$ | 35.3 |
| $Vd3_4$ | 63.4 | AAG3 | 12.633 mm | TTL3 | 18.173 mm |
| BFL3 | 5.84 mm | $Nd3_3$ | 1.91 | $Nd3_4$ | 1.62 |
| $f3_1$ | −4.548 mm | $f3_2$ | 11.483 mm | $f3_3$ | 10.266 mm |
| f3 | 3.29 mm | | | | |
| $Vd3_1 + Vd3_2$ | 105.8 | $Vd3_4 - Vd3_3$ | 28.1 | AAG3/TTL3 | 0.695 |
| BFL3/TTL3 | 0.321 | $Nd3_3 - Nd3_4$ | 0.29 | $f3_2/f3_3$ | 1.12 |
| $|f3_1/f3|$ | 1.38 | | | | |

Figure 6A:
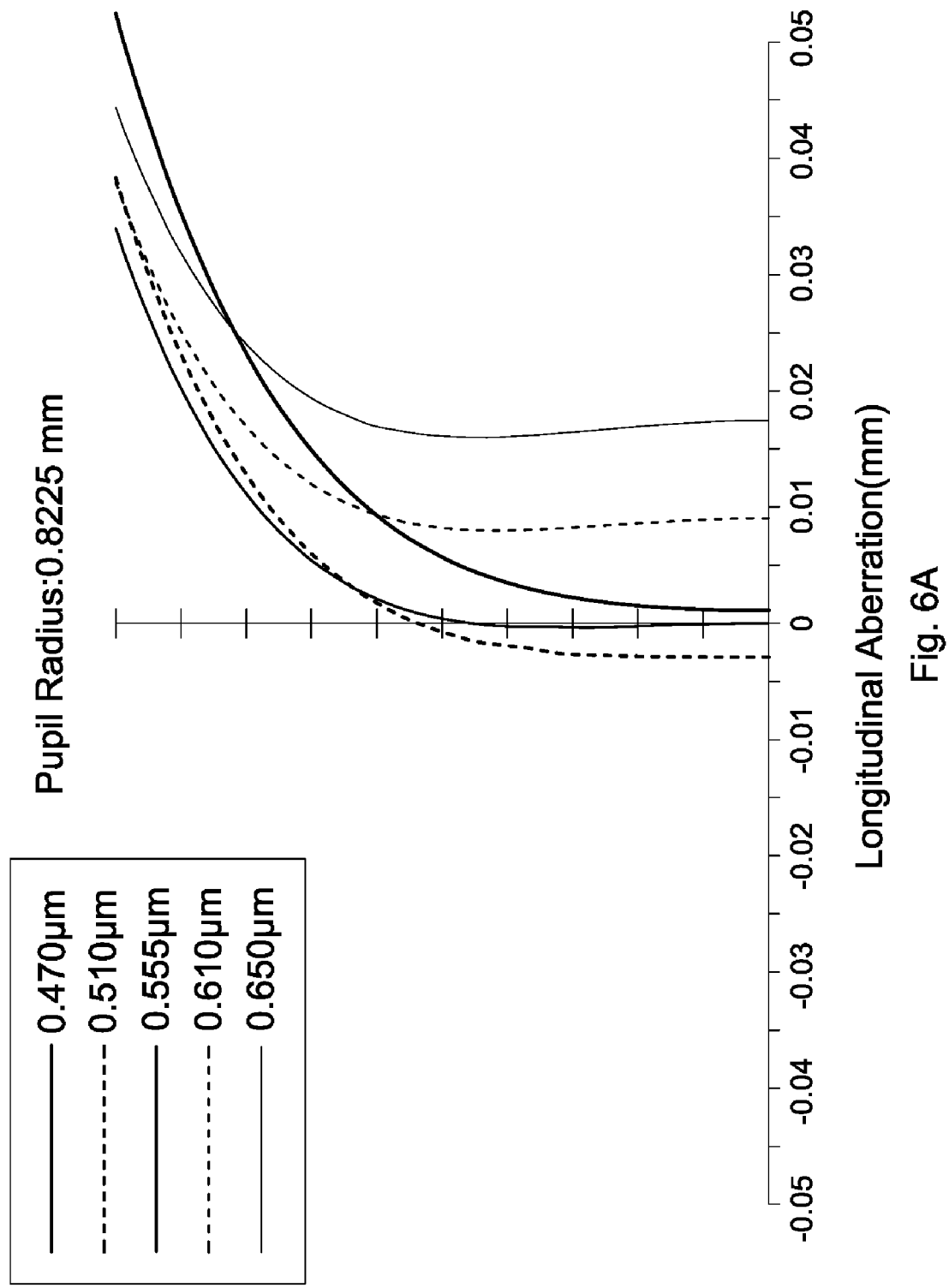
FIG. 6A depicts a longitudinal aberration diagram of the wide-angle lens assembly in accordance with the third embodiment of the invention.
Figure 6B:
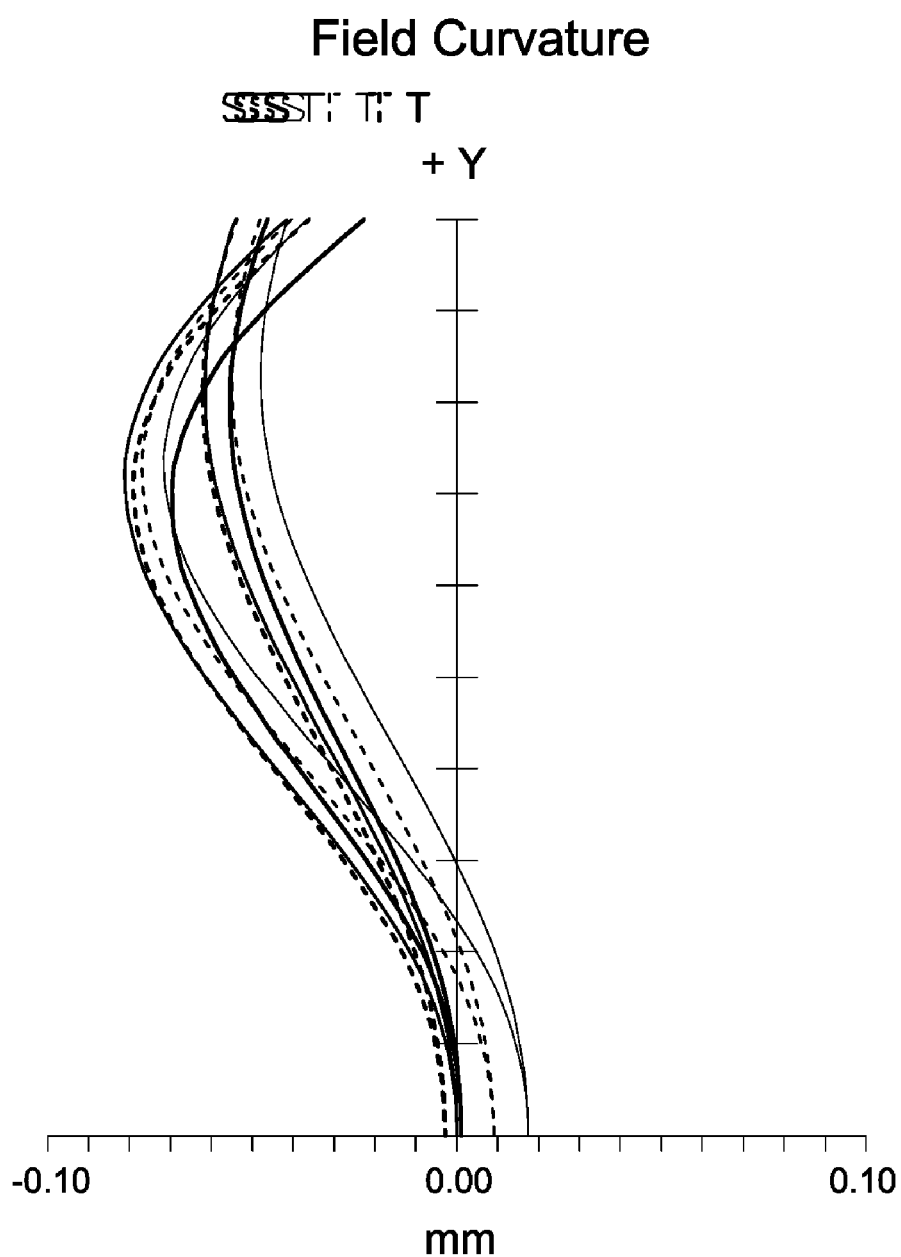
FIG. 6B is a field curvature diagram of the wide-angle lens assembly in accordance with the third embodiment of the invention.
Figure 6C:
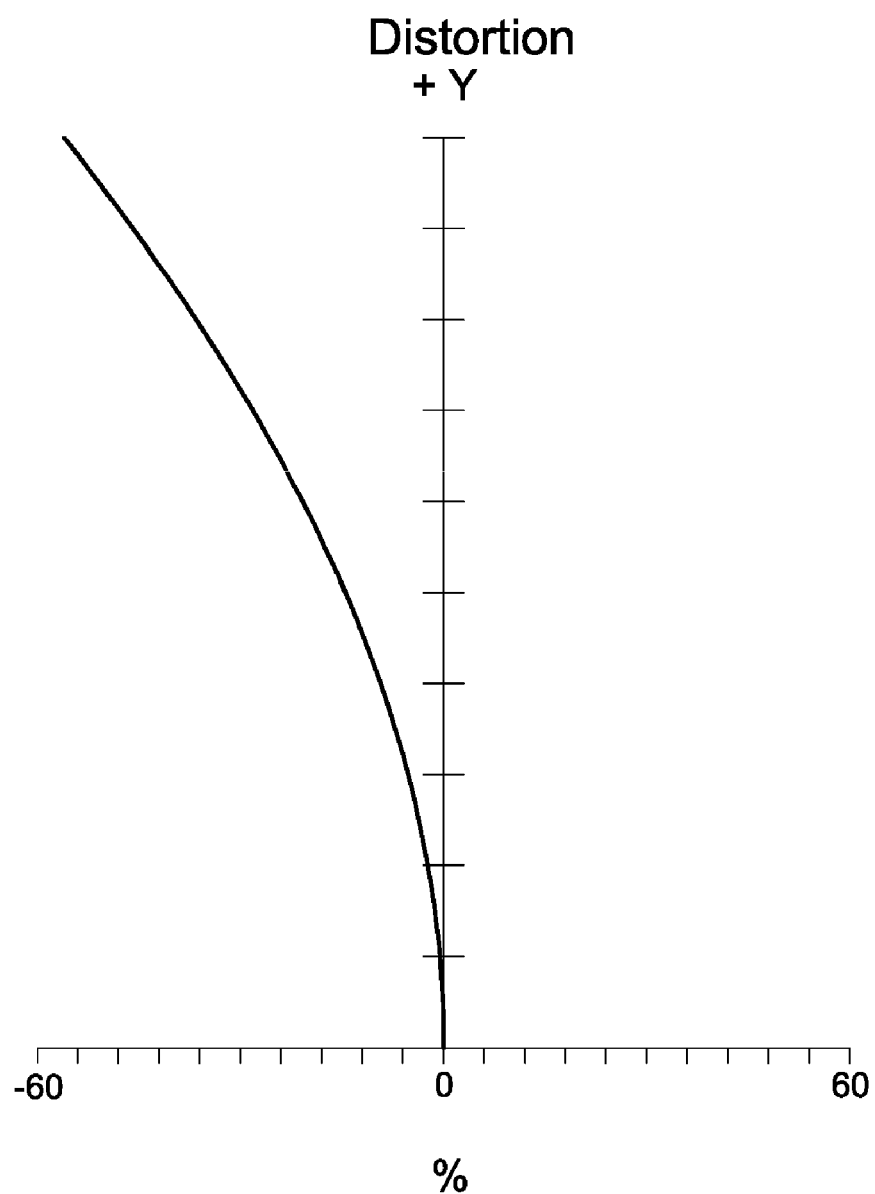
FIG. 6C is a distortion diagram of the wide-angle lens assembly in accordance with the third embodiment of the invention.

By the above arrangements of the lenses and stop ST3, the wide-angle lens assembly 3 of the third embodiment can meet the requirements of optical performance as seen in FIGS. 6A-6C, wherein FIG. 6A shows a longitudinal aberration diagram of the wide-angle lens assembly 3 in accordance with the third embodiment of the invention, FIG. 6B shows a field curvature diagram of the wide-angle lens assembly 3 in accordance with the third embodiment of the invention, and FIG. 6C shows a distortion diagram of the wide-angle lens assembly 3 in accordance with the third embodiment of the invention.

It can be seen from FIG. 6A that the longitudinal aberration in the wide-angle lens assembly 3 of the third embodiment ranges from −0.005 mm to 0.055 mm for the wavelength of 0.470 μm, 0.510 μm, 0.555 μm, 0.610 μm, and 0.650 μm.

It can be seen from FIG. 6B that the field curvature of tangential direction and sagittal direction in the wide-angle lens assembly 3 of the third embodiment ranges from −0.09 mm to 0.02 mm for the wavelength of 0.470 μm, 0.510 μm, 0.555 μm, 0.610 μm, and 0.650 μm.

It can be seen from FIG. 6C (in which the five lines in the figure almost coincide to appear as if a signal line) that the distortion in the wide-angle lens assembly 3 of the third embodiment ranges from −60% to 0% for the wavelength of 0.470 μm, 0.510 μm, 0.555 μm, 0.610 μm, and 0.650 μm.

It is obvious that the longitudinal aberration, the field curvature, and the distortion of the wide-angle lens assembly 3 of the third embodiment can be corrected effectively. Therefore, the wide-angle lens assembly 3 of the third embodiment is capable of good optical performance.

Figure 7:
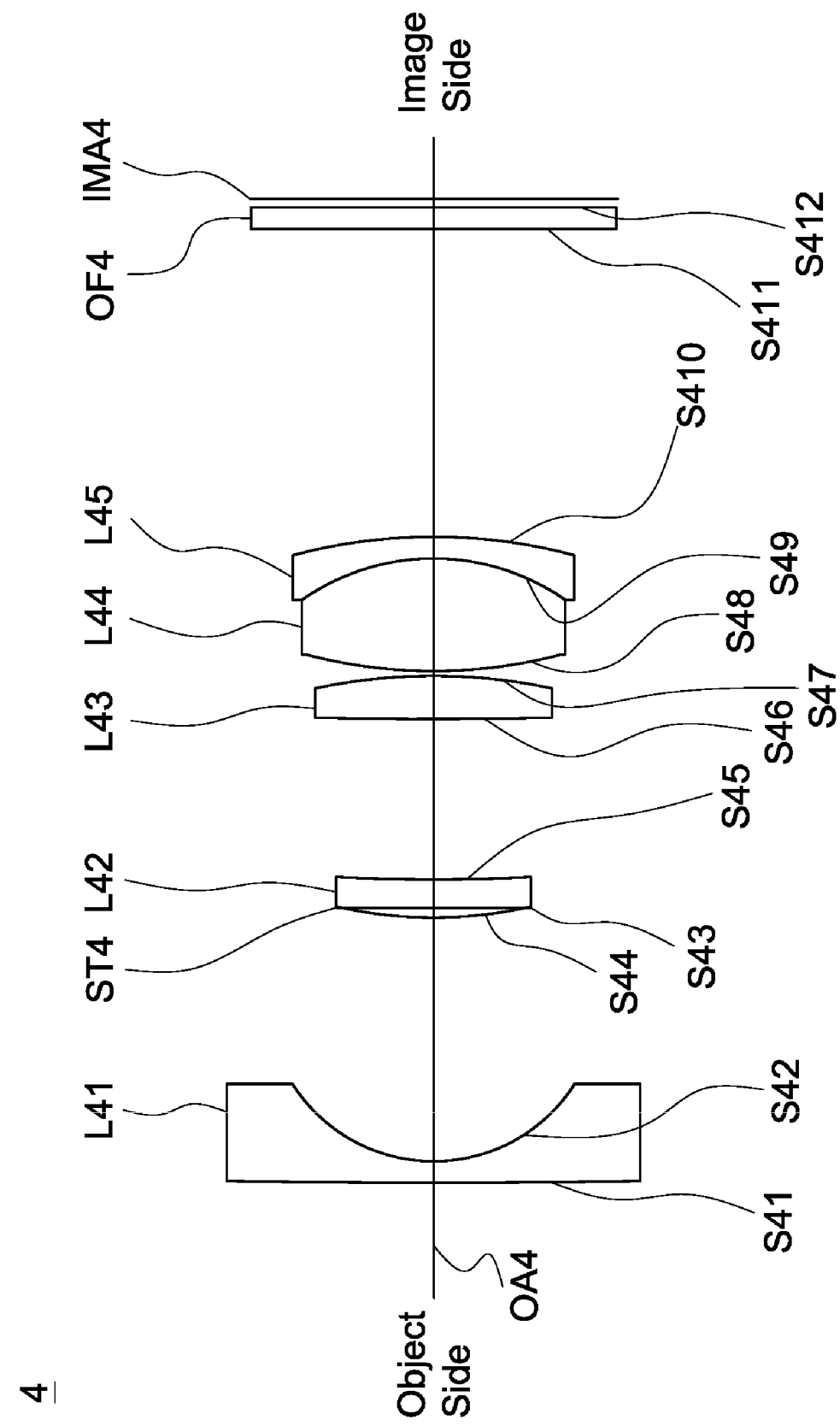
FIG. 7 is a lens layout diagram of a wide-angle lens assembly in accordance with a fourth embodiment of the invention.

Referring to FIG. 7, FIG. 7 is a lens layout diagram of a wide-angle lens assembly in accordance with a fourth embodiment of the invention. The wide-angle lens assembly 4 includes a first lens L41, a stop ST4, a second lens L42, a third lens L43, a fourth lens L44, a fifth lens L45, and an optical filter OF4, all of which are arranged in order from an object side to an image side along an optical axis OA4. In operation, an image of light rays from the object side is formed at an image plane IMA4.

The first lens L41 is a meniscus lens with negative refractive power and made of glass material, wherein the object side surface S41 is a convex surface, the image side surface S42 is a concave surface, and both of the object side surface S41 and image side surface S42 are spherical surfaces.

The second lens L42 is a meniscus lens with positive refractive power and made of glass material, wherein the object side surface S44 is a convex surface, the image side surface S45 is a concave surface, and both of the object side surface S44 and image side surface S45 are spherical surfaces.

The third lens L43 is a biconvex lens with positive refractive power and made of glass material, wherein the object side surface S46 is a convex surface, the image side surface S47 is a convex surface, and both of the object side surface S46 and image side surface S47 are spherical surfaces.

The fourth lens L44 is a biconvex lens with positive refractive power and made of glass material, wherein the object side surface S48 is a convex surface, the image side surface S49 is a convex surface, and both of the object side surface S48 and image side surface S49 are spherical surfaces.

The fifth lens L45 is a meniscus lens with negative refractive power and made of glass material, wherein the object side surface S49 is a concave surface, the image side surface S410 is a convex surface, and both of the object side surface S49 and image side surface S410 are spherical surfaces.

The fourth lens L44 and the fifth lens L45 are cemented.

Both of the object side surface S411 and image side surface S412 of the optical filter OF4 are plane surfaces.

In order to maintain excellent optical performance of the wide-angle lens assembly in accordance with the fourth embodiment of the invention, the wide-angle lens assembly 4 satisfies at least one of the following conditions:

$$Vd4_1 + Vd4_2 \geq 90 \quad (22)$$

$$Vd4_4 - Vd4_3 \geq 20 \quad (23)$$

$$AAG4/TTL4 \geq 0.55 \quad (24)$$

$$0.28 \leq BFL4/TTL4 \leq 0.38 \quad (25)$$

$$Nd4_3 - Nd4_4 \geq 0.23 \quad (26)$$

$$0.9 \leq f4_2/f4_3 \leq 1.3 \quad (27)$$

$$1.2 \leq |f4_1/f4| \leq 1.6 \quad (28)$$

The definition of $Vd4_1$, $Vd4_2$, $Vd4_3$, $Vd4_4$, AAG4, TTL4, BFL4, $Nd4_3$, $Nd4_4$, f4, $f4_1$, $f4_2$, and $f4_3$ are the same as that of $Vd1_1$, $Vd1_2$, $Vd1_3$, $Vd1_4$, AAG1, TTL1, BFL1, $Nd1_3$, $Nd1_4$, f1, $f1_1$, $f1_2$, and $f1_3$ in the first embodiment, and is not described here again.

By the above design of the lenses, stop ST4, and satisfies at least one of the conditions (22)-(28), the wide-angle lens assembly 4 is provided with an effective increased field of view, an effective shortened total lens length, an effective decreased F-number, an effective corrected aberration, and a resistance to severe environment temperature variation.

If the value $Vd4_4$-$Vd4_3$ of condition (23) is less than 20 than the achromatic ability for the wide-angle lens assembly 4 is not good. Therefore, the value $Vd4_4$-$Vd4_3$ must be at least equal to or greater than 20. An optimal range for $Vd4_4$-$Vd4_3$ is equal to or greater than 20. The best achromatic condition for the wide-angle lens assembly 4 can be achieved when the optimal range is satisfied.

In order to achieve the above purposes and effectively enhance the optical performance, the wide-angle lens assembly 4 in accordance with the fourth embodiment of the invention is provided with the optical specifications shown in Table 7, which include the effective focal length, F-number, total lens length, radius of curvature of each lens surface, thickness between adjacent surface, refractive index of each lens, and Abbe number of each lens. Table 7 shows that the effective focal length is equal to 3.33 mm, F-number is equal to 2.0, and total lens length is equal to 17.918 mm for the wide-angle lens assembly 4 of the fourth embodiment of the invention.

TABLE 7

Effective Focal Length = 3.33 mm
F-number = 2.0
Total Lens Length = 17.918 mm

| Surface Number | Radius of Curvature (mm) | Thickness (mm) | Nd | Vd | Remark |
|---|---|---|---|---|---|
| S41 | 257.802 | 0.391 | 1.73 | 53.90 | The First Lens L41 |
| S42 | 3.051 | 4.623 | | | |
| S43 | ∞ | −0.187 | | | Stop ST4 |
| S44 | 7.998 | 0.699 | 1.88 | 37.80 | The Second Lens L42 |
| S45 | 36.401 | 2.920 | | | |
| S46 | 89.143 | 0.787 | 1.91 | 35.30 | The Third Lens L43 |
| S47 | −10.382 | 0.093 | | | |
| S48 | 9.295 | 2.059 | 1.62 | 58.30 | The Fourth Lens L44 |
| S49 | −4.139 | 0.398 | 2.10 | 17.00 | The Fifth Lens L45 |
| S410 | −9.623 | 5.587 | | | |
| S411 | ∞ | 0.400 | 1.52 | 54.50 | Optical Filter OF4 |
| S412 | ∞ | 0.150 | | | |

Table 8 shows the parameters and condition values for conditions (22)-(28). As can be seen from Table 8, the wide-angle lens assembly 4 of the fourth embodiment satisfies the conditions (22)-(28).

TABLE 8

| $Vd4_1$ | 53.9 | $Vd4_2$ | 37.8 | $Vd4_3$ | 35.3 |
|---|---|---|---|---|---|
| $Vd4_4$ | 58.3 | AAG4 | 13.183 mm | TTL4 | 17.918 mm |
| BFL4 | 6.14 mm | $Nd4_3$ | 1.91 | $Nd4_4$ | 1.62 |
| $f4_1$ | −4.223 mm | $f4_2$ | 11.418 mm | $f4_3$ | 10.194 mm |
| f4 | 3.33 mm | | | | |
| $Vd4_1$ + $Vd4_2$ | 91.7 | $Vd4_4$ − $Vd4_3$ | 23 | AAG4/ TTL4 | 0.736 |
| BFL4/ TTL4 | 0.343 | $Nd4_3$ − $Nd4_4$ | 0.29 | $f4_2/f4_3$ | 1.12 |
| $|f4_1/f4|$ | 1.27 | | | | |

Figure 8A:
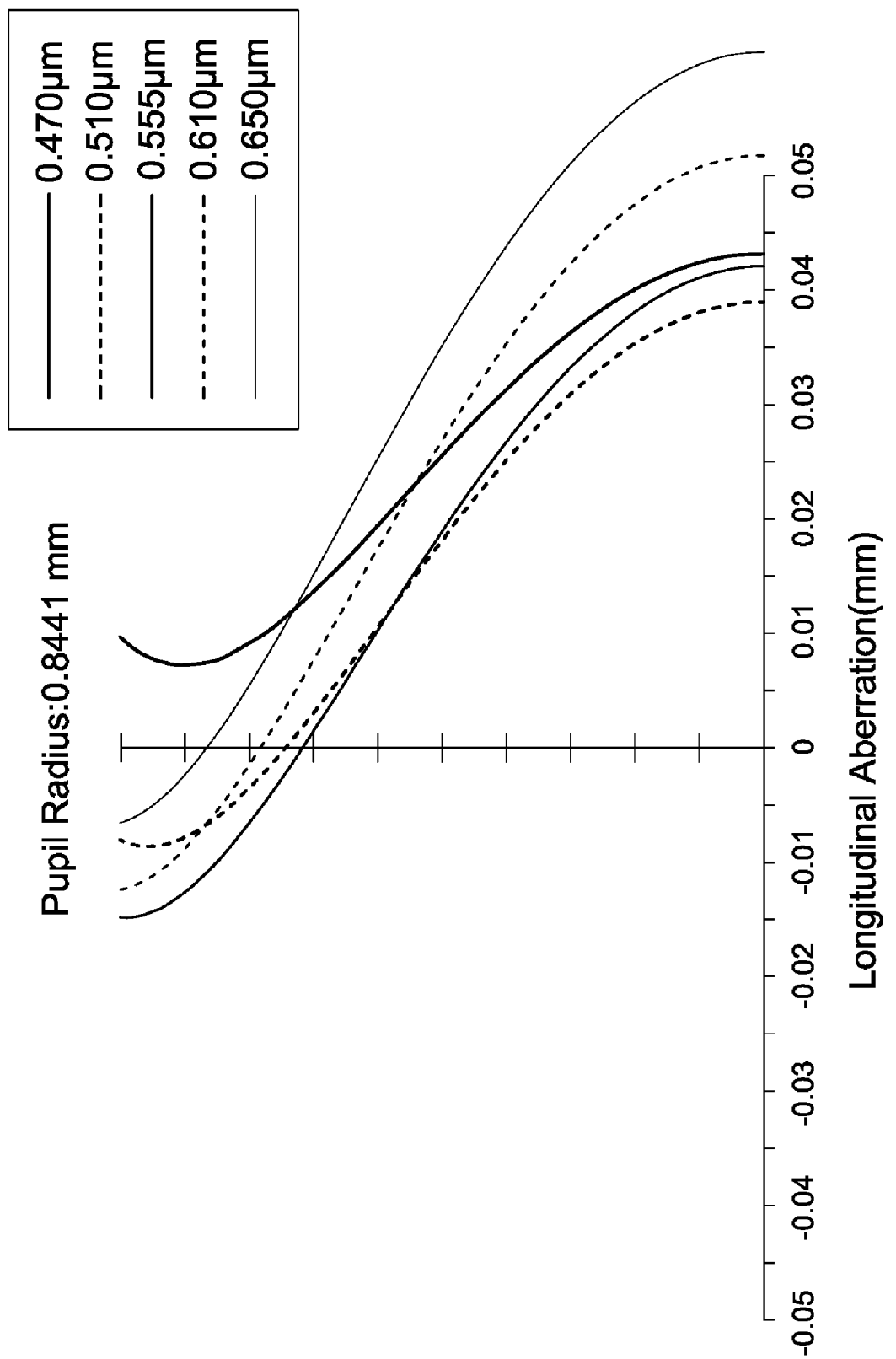
FIG. 8A depicts a longitudinal aberration diagram of the wide-angle lens assembly in accordance with the fourth embodiment of the invention.
Figure 8B:
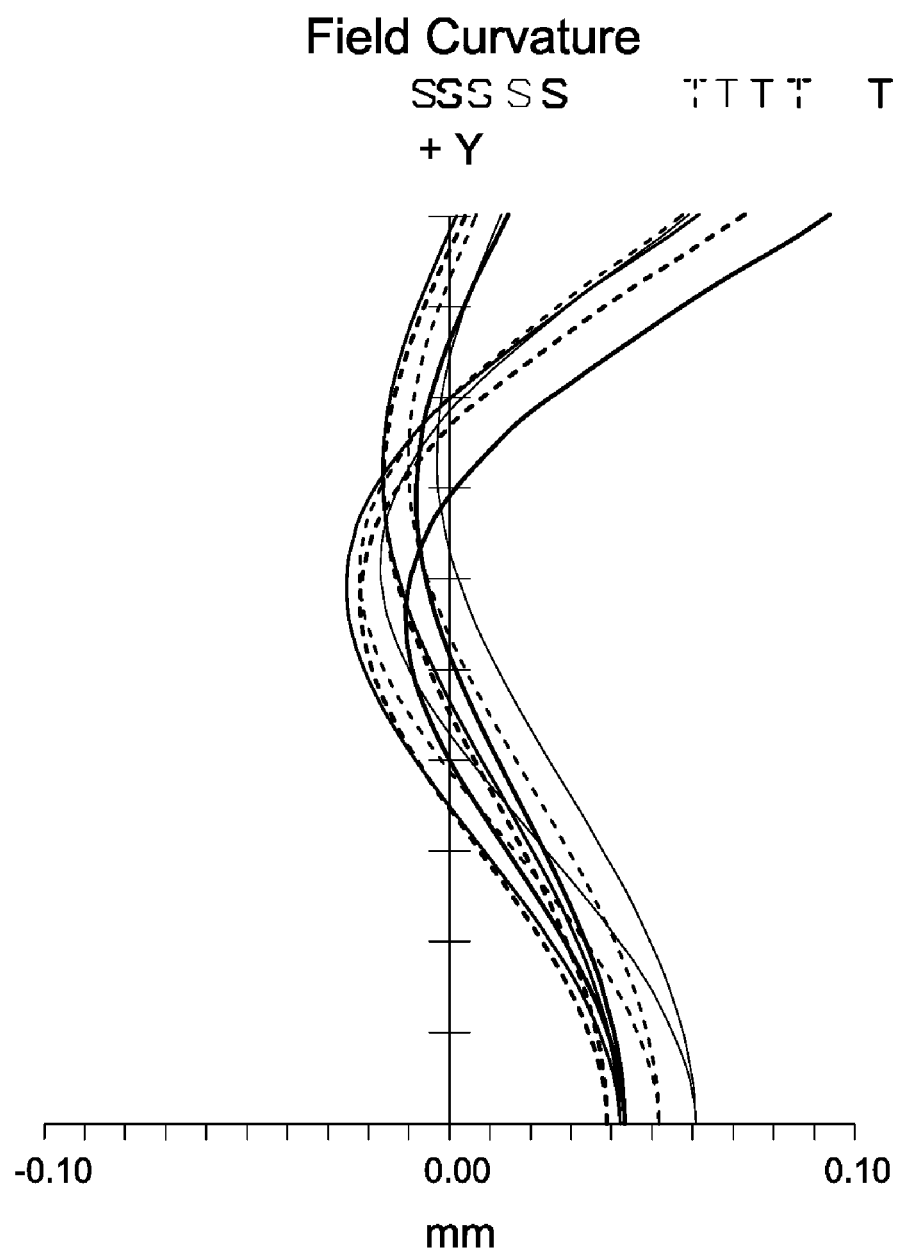
FIG. 8B is a field curvature diagram of the wide-angle lens assembly in accordance with the fourth embodiment of the invention.
Figure 8C:
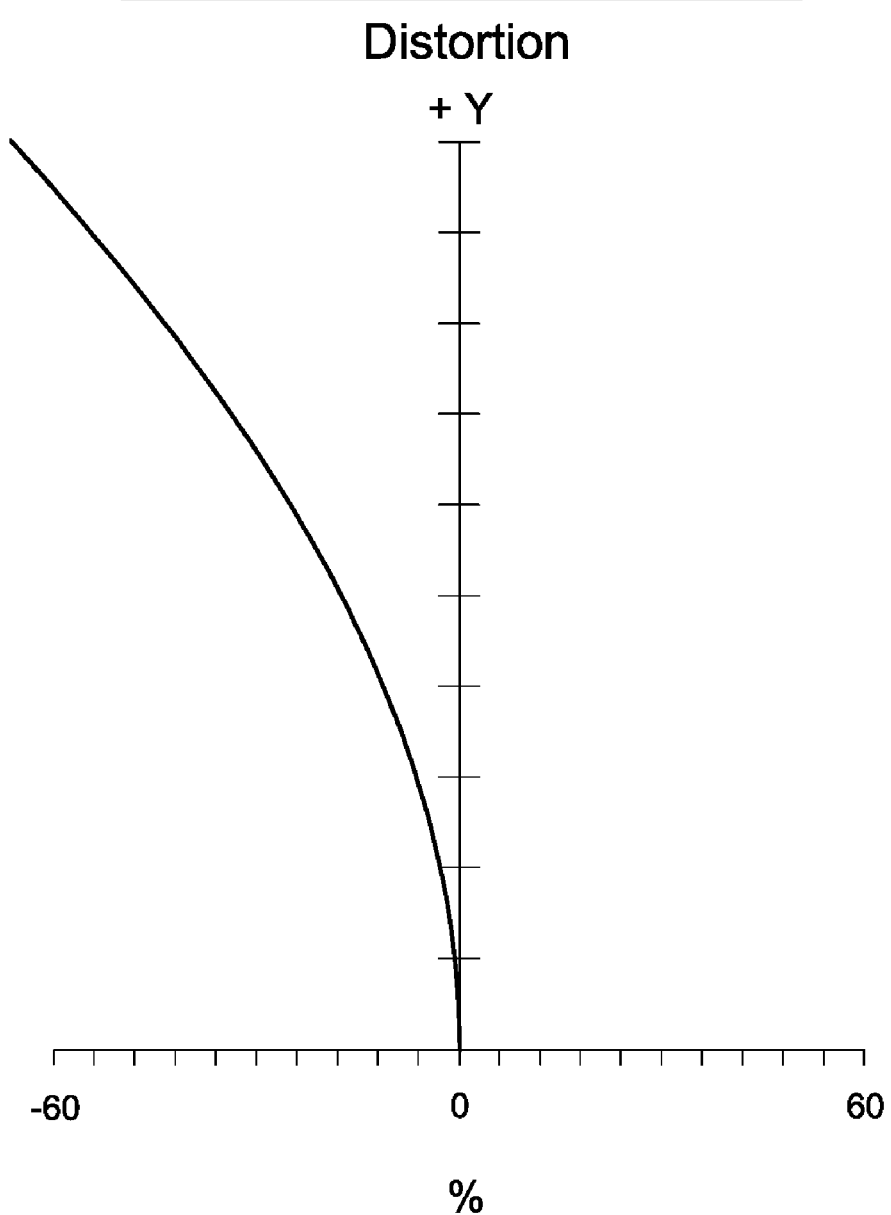
FIG. 8C is a distortion diagram of the wide-angle lens assembly in accordance with the fourth embodiment of the invention.

By the above arrangements of the lenses and stop ST4, the wide-angle lens assembly 4 of the fourth embodiment can meet the requirements of optical performance as seen in FIGS. 8A-8C, wherein FIG. 8A shows a longitudinal aberration diagram of the wide-angle lens assembly 4 in accordance with the fourth embodiment of the invention, FIG. 8B shows a field curvature diagram of the wide-angle lens assembly 4 in accordance with the fourth embodiment of the invention, and FIG. 8C shows a distortion diagram of the wide-angle lens assembly 4 in accordance with the fourth embodiment of the invention.

It can be seen from FIG. 8A that the longitudinal aberration in the wide-angle lens assembly 4 of the fourth embodiment ranges from −0.015 mm to 0.065 mm for the wavelength of 0.470 μm, 0.510 μm, 0.555 μm, 0.610 μm, and 0.650 μm.

It can be seen from FIG. 8B that the field curvature of tangential direction and sagittal direction in the wide-angle lens assembly 4 of the fourth embodiment ranges from −0.03 mm to 0.10 mm for the wavelength of 0.470 μm, 0.510 μm, 0.555 μm, 0.610 μm, and 0.650 μm.

It can be seen from FIG. 8C (in which the five lines in the figure almost coincide to appear as if a signal line) that the distortion in the wide-angle lens assembly 4 of the fourth embodiment ranges from −67% to 0% for the wavelength of 0.470 μm, 0.510 μm, 0.555 μm, 0.610 μm, and 0.650 μm.

It is obvious that the longitudinal aberration, the field curvature, and the distortion of the wide-angle lens assembly 4 of the fourth embodiment can be corrected effectively. Therefore, the wide-angle lens assembly 4 of the fourth embodiment is capable of good optical performance.

The main conditions for the present invention are $0.9 \le f_2/f_3 \le 1.3$, $1.2 \le |f_1/f| \le 1.6$, $Vd_1+Vd_2$ 90, and $Vd_4-Vd_3 \ge 20$. The condition values of the embodiments for the present invention also fall within the range of the remaining conditions. The condition: $0.9 \le f_2/f_3 \le 1.3$ benefits to overall aberration correction. The condition: $1.2 \le |f_1/f| \le 1.6$ benefits to a balance between the wide-angle optical characteristics and manufacturing. The condition: $Vd_1+Vd_2$ 90 benefits to a better achromatic ability and the optimal range for $Vd_1+Vd_2$ is from 90 to 118. The condition: $Vd_4-Vd_3 \ge 20$ also benefits to a better achromatic ability and the optimal range for $Vd_4-Vd_3$ is from 20 to 35.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
   a first lens which is a meniscus lens with negative refractive power;
   a second lens which is with positive refractive power and comprises a convex surface facing an object side;
   a third lens which is with positive refractive power and comprises a convex surface facing an image side;
   a fourth lens which is with positive refractive power and comprises a convex surface facing the object side; and
   a fifth lens which is with negative refractive power and comprises a concave surface facing the object side and a convex surface facing the image side;
   wherein the first lens, the second lens, the third lens, the fourth lens, and the fifth lens are arranged in order from the object side to the image side along an optical axis;
   wherein the wide-angle lens assembly satisfies:

$AAG/TTL \ge 0.55$, $Nd_3 - Nd_4 \ge 0.23$, $1.2 \le |f_1/f| \le 1.6$, wherein AAG is a total air interval from the first lens to an image plane along the optical axis, TTL is an interval from an object side surface of the first lens to the image plane along the optical axis, $Nd_3$ is an index of refraction of the third lens, $Nd_4$ is an index of refraction of the fourth lens, $f_1$ is an effective focal length of the first lens, and f is an effective focal length of the wide-angle lens assembly.

2. The wide-angle lens assembly as claimed in claim 1, wherein the first lens further comprises a convex surface facing the object side and the fourth lens further comprises a convex surface facing the image side.

3. The wide-angle lens assembly as claimed in claim 1, wherein the wide-angle lens assembly satisfies:

$Vd_1 + Vd_2 \le 90$, wherein $Vd_1$ is an Abbe number of the first lens and $Vd_2$ is an Abbe number of the second lens.

4. The wide-angle lens assembly as claimed in claim 1, wherein the wide-angle lens assembly satisfies:

$0.9 \le f_2/f_3 \le 1.3$, wherein $f_2$ is an effective focal length of the second lens and $f_3$ is an effective focal length of the third lens.

5. The wide-angle lens assembly as claimed in claim 1, wherein the fourth lens and the fifth lens are cemented and the wide-angle lens assembly further comprises a stop disposed between the first lens and the second lens.

6. The wide-angle lens assembly as claimed in claim 1, wherein the wide-angle lens assembly satisfies:

$Vd_4 - Vd_3 \ge 20$, wherein $Vd_3$ is an Abbe number of the third lens and $Vd_4$ is an Abbe number of the fourth lens.

7. The wide-angle lens assembly as claimed in claim 6, wherein the wide-angle lens assembly satisfies:

$0.28 \le BFL/TTL \le 0.38$, wherein BFL is an interval from the convex surface of the fifth lens to the image plane along the optical axis.

8. The wide-angle lens assembly as claimed in claim 1 wherein the first lens comprises a concave surface facing the image side, the second lens further comprises a concave surface facing the image side, the third lens further comprises a convex surface facing the object side, and the fourth lens further comprises a convex surface facing the image side.

9. The wide-angle lens assembly as claimed in claim 8, wherein the wide-angle lens assembly satisfies:

$Vd_1 + Vd_2 \ge 90$, wherein $Vd_1$ is an Abbe number of the first lens and $Vd_2$ is an Abbe number of the second lens.

10. The wide-angle lens assembly as claimed in claim 9, wherein the wide-angle lens assembly satisfies:

$0.9 \le f_2/f_3 \le 1.3$, wherein $f_2$ is an effective focal length of the second lens and $f_3$ is an effective focal length of the third lens.

11. The wide-angle lens assembly as claimed in claim 8, wherein the wide-angle lens assembly satisfies:

$0.28 \le BFL/TTL \le 0.38$, wherein BFL is an interval from the convex surface of the fifth lens to the image plane along the optical axis.

12. The wide-angle lens assembly as claimed in claim 11, wherein the fourth lens and the fifth lens are cemented and the wide-angle lens assembly further comprises a stop disposed between the first lens and the second lens.

13. A wide-angle lens assembly comprising:
a first lens which is a meniscus lens with negative refractive power;
a second lens which is with positive refractive power and comprises a convex surface facing an object side;
a third lens which is with positive refractive power and comprises a convex surface facing an image side;
a fourth lens which is with positive refractive power and comprises a convex surface facing the object side; and
a fifth lens which is with negative refractive power and comprises a concave surface facing the object side and a convex surface facing the image side;
wherein the first lens, the second lens, the third lens, the fourth lens, and the fifth lens are arranged in order from the object side to the image side along an optical axis;
wherein the wide-angle lens assembly satisfies:

$AAG/TTL \geq 0.55$, $Vd_4 - Vd_3 \geq 20$, $1.2 \leq |f_1/f| \leq 1.6$, wherein AAG is a total air interval from the first lens to an image plane along the optical axis, TTL is an interval from an object side surface of the first lens to the image plane along the optical axis, $Vd_3$ is an Abbe number of the third lens, $Vd_4$ is an Abbe number of the fourth lens, $f_1$ is an effective focal length of the first lens, and f is an effective focal length of the wide-angle lens assembly.

14. The wide-angle lens assembly as claimed in claim 13, wherein the wide-angle lens assembly satisfies:

$Nd_3 - Nd_4 \geq 0.23$, wherein $Nd_3$ is an index of refraction of the third lens and $Nd_4$ is an index of refraction of the fourth lens.

15. A wide-angle lens assembly comprising:
a first lens which is a meniscus lens with negative refractive power;
a second lens which is with positive refractive power and comprises a convex surface facing an object side;
a third lens which is with positive refractive power and comprises a convex surface facing an image side;
a fourth lens which is with positive refractive power and comprises a convex surface facing the object side; and
a fifth lens which is with negative refractive power and comprises a concave surface facing the object side and a convex surface facing the image side;
wherein the first lens, the second lens, the third lens, the fourth lens, and the fifth lens are arranged in order from the object side to the image side along an optical axis;
wherein the wide-angle lens assembly satisfies:

$Nd_3 - Nd_4 \geq 0.23$, $0.9 \leq f_2/f_3 \leq 1.3$, $1.2 \leq |f_1/f| \leq 1.6$, wherein $Nd_3$ is an index of refraction of the third lens, $Nd_4$ is an index of refraction of the fourth lens, f is an effective focal length of the wide-angle lens assembly, $f_1$ is an effective focal length of the first lens, $f_2$ is an effective focal length of the second lens, and $f_3$ is an effective focal length of the third lens.

16. The wide-angle lens assembly as claimed in claim 15, wherein the wide-angle lens assembly satisfies:

$AAG/TTL \geq 0.55$, wherein AAG is a total air interval from the first lens to an image plane along the optical axis and TTL is an interval from an object side surface of the first lens to the image plane along the optical axis.

17. The wide-angle lens assembly as claimed in claim 15, wherein the first lens further comprises a convex surface facing the object side and the fourth lens further comprises a convex surface facing the image side.

18. The wide-angle lens assembly as claimed in claim 15, wherein the wide-angle lens assembly satisfies:

$Vd_4 - Vd_3 \geq 20$, wherein $Vd_3$ is an Abbe number of the third lens and $Vd_4$ is an Abbe number of the fourth lens.

19. The wide-angle lens assembly as claimed in claim 15, wherein the fourth lens and the fifth lens are cemented and the wide-angle lens assembly further comprises a stop disposed between the first lens and the second lens.

* * * * *